(12) United States Patent
Duarte

(10) Patent No.: US 8,611,935 B2
(45) Date of Patent: Dec. 17, 2013

(54) SYSTEM AND METHOD FOR PROVIDING ALERTS TO MEMBERS OF DEFINED LOCAL GEOGRAPHICAL GROUPS

(75) Inventor: Keith B. Duarte, Newport Coast, CA (US)

(73) Assignee: Data Frenzy, LLC, Newport Beach, CA (US)

( * ) Notice: Subject to any disclaimer, the term of this patent is extended or adjusted under 35 U.S.C. 154(b) by 0 days.

(21) Appl. No.: 13/051,999

(22) Filed: Mar. 18, 2011

(65) Prior Publication Data

US 2012/0238234 A1 Sep. 20, 2012

(51) Int. Cl.
*H04W 4/00* (2009.01)
*H04W 4/14* (2009.01)
*H04W 4/12* (2009.01)
*H04L 12/58* (2006.01)

(52) U.S. Cl.
CPC *H04W 4/14* (2013.01); *H04W 4/12* (2013.01); *H04L 12/5895* (2013.01)
USPC .................. 455/466; 713/193; 701/1; 705/5; 705/64; 705/75

(58) Field of Classification Search
USPC .................. 455/466; 701/1, 29; 705/5, 64, 75
See application file for complete search history.

(56) References Cited

U.S. PATENT DOCUMENTS

| | | | | |
|---|---|---|---|---|
| 7,216,109 B1 * | 5/2007 | Donner | ............................ | 705/64 |
| 7,280,975 B1 * | 10/2007 | Donner | ............................ | 705/5 |
| 7,386,517 B1 * | 6/2008 | Donner | ............................ | 705/75 |
| 2003/0221118 A1 * | 11/2003 | Walker | ............................ | 713/193 |
| 2005/0080520 A1 * | 4/2005 | Kline et al. | ....................... | 701/1 |
| 2005/0261012 A1 * | 11/2005 | Weiser | ............................ | 455/466 |
| 2006/0287783 A1 * | 12/2006 | Walker | ............................ | 701/29 |

* cited by examiner

*Primary Examiner* — William D Cumming
(74) *Attorney, Agent, or Firm* — Fountain Law Group, Inc.; George L. Fountain

(57) ABSTRACT

A system and method are disclosed for creating groups associated with defined geographical neighborhoods for the purpose of providing and distributing information to members of the neighborhood groups, and soliciting assistance from members of the neighborhood groups. For example, an alert concerning a missing child may be sent from a user device (e.g., smart phone) to a server located on the Internet for distribution to user devices of members of a neighborhood groups. The notified members, in turn, using their respective user devices, may send notifications to the alert-originating user (as well as other members) of their participation in the search for the missing child. Additionally, the notified members may send notifications to the alert-originating user of the finding of the lost child. Such features may also apply to other alerts and/or notifications sent to members of a neighborhood group.

28 Claims, 21 Drawing Sheets

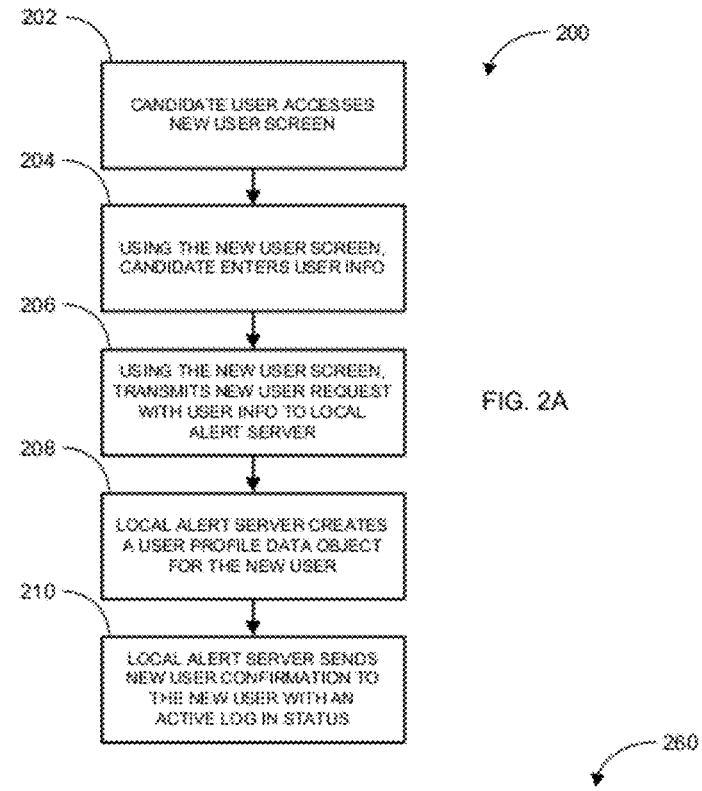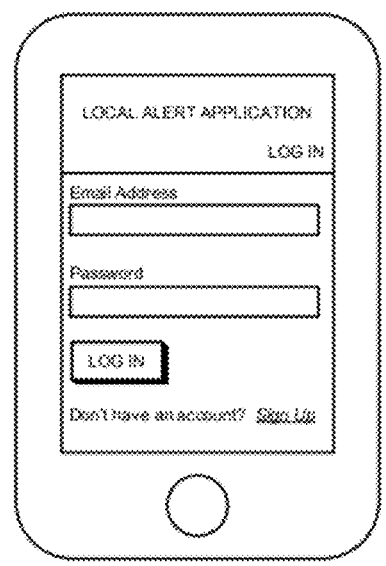
FIG. 2A
FIG. 2B
FIG. 2C

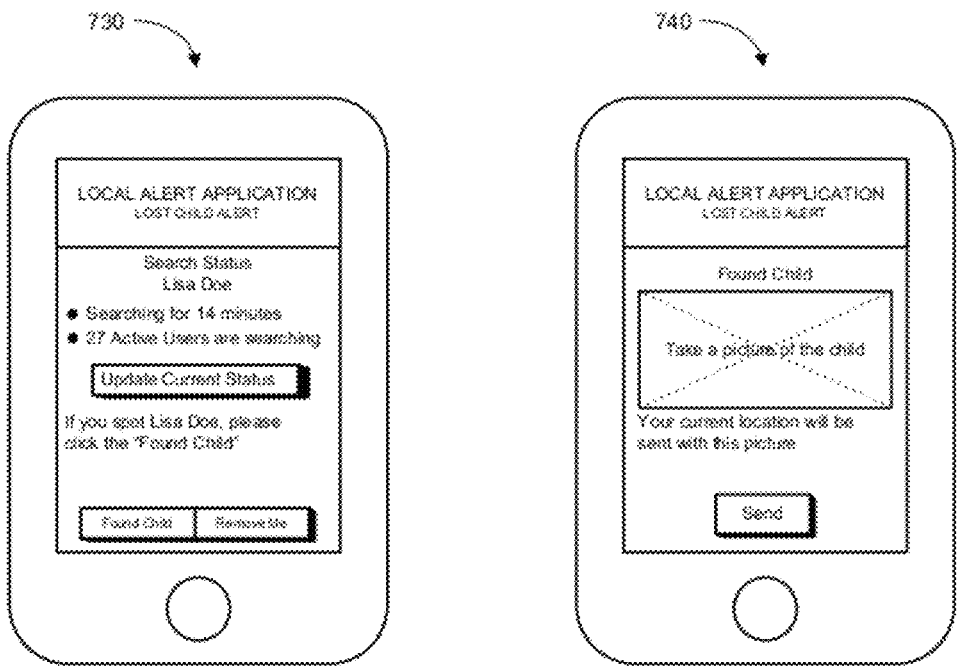
FIG. 7B
FIG. 7C
FIG. 7D

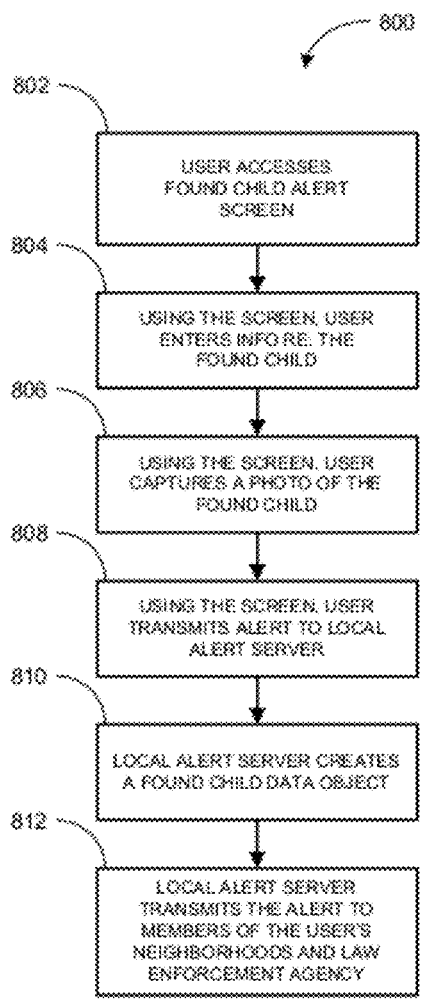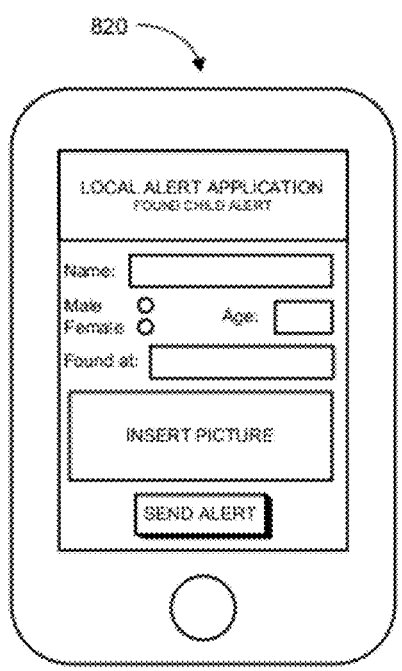
FIG. 8A
FIG. 8B

SYSTEM AND METHOD FOR PROVIDING ALERTS TO MEMBERS OF DEFINED LOCAL GEOGRAPHICAL GROUPS

FIELD

This invention relates generally to communication systems, and in particular, to a system and method for providing alerts to members of a defined local geographical group.

BACKGROUND

Many children are lost every day. Often, the parent or legal guardian quickly finds the child by simply searching the area or vicinity in which the child was last known to be. However, in other circumstances, the parent or legal guardian is not able to find the lost child within an hour or more. In such circumstances, the parent or legal guardian may contact local law enforcement authority to assist in the finding of the child. The involvement of local authority may also lead to the successful finding of the lost child.

In more dire circumstances, for example, when a child has been lost for several hours or days, the parent or legal guardian will often attempt to get the local community involved in the searching for the lost child. In this regard, the parent or legal guardian may create flyers with a picture of the lost child and pertinent information, and place the flyers at various locations around the local neighborhood. Additionally, the parent or legal guardian may telephone neighbors, friends and acquaintances in the neighborhood to ask them for assistance in searching for the child.

Such traditional methods for locating lost children have many drawbacks. For instance, the chances or probability of a lost child being found generally decreases non-linearly over time. Thus, it is desirable for the lost child to be found quickly as soon as his/her disappearance is known. However, the traditional ways of locating a lost child, such as contacting the local authority or seeking the assistance of members of the local community, often take substantial amount of time. In the case of contacting local authority, often the local authority has legal restraints before it can commence a search for a lost child or person. And, in the case of contacting members of the local community, this is usually a time-consuming tasks.

SUMMARY

An aspect of the disclosure relates to a system, method, and devices for establishing one or more neighborhood groups for transmitting various local information to members of the one or more neighborhood groups, respectively. Such local information may relate to an alert concerning a lost or missing child proximate or within a defined geographical neighborhood associated with a neighborhood group. Alternatively, or in addition to, such local information may relate to an alert concerning a found child located proximate or within a defined geographical neighborhood associated with a neighborhood group. Alternatively, or in addition to, such local information may relate to lost persons (regardless of age), found persons (regardless of age), lost pets, crimes, and elderly and disabled people care proximate or within a defined geographical neighborhood associated with a neighborhood group.

To effectuate such related functionality, the system includes a server coupled to a wide area network (WAN), such as the Internet. The server is adapted to create neighborhood group data objects upon requests of users. Each neighborhood group data object includes information related to the associated neighborhood, such as the name or identity of the neighborhood; information related to the users or members of the neighborhood group, such as in the form of a plurality of user profile data objects; and information related to pending notifications, such as in the form of notification data objects, including lost child data object, found child data object, lost pet data object, local crime data object, elderly/disabled care request data object, and others.

A user, using a user device, communicates with the server, via the WAN and/or a cellular telephone network, to, for example, create a neighborhood group, administer or manage the neighborhood group, send invitation to candidate users to join the neighborhood group, and receive and approve (or deny) requests from users to join a neighborhood group. Additionally, a user, using a user device, may send notifications, such as lost child alerts, found child alerts, lost pet alerts, crime alerts, and care requests, to members of a neighborhood group to seek assistance with (or to merely inform them of) the alerts. Further, a user, using a user device, may receive such notifications as a member of a neighborhood group, volunteer to assist in the nature of the notifications, and report back to the originators information concerning the notifications, such as the finding of the missing child or pet, or the identity of the parent or legal guardian of the found child, or evidence related to a crime, or an indication that the user will assist in a particular care requests.

The system is valuable because potentially current and accurate local-related information may be quickly provided to people residing proximate or within a defined geographical neighborhood. These people, or members of the corresponding neighborhood group, are more apt to be interested in the information, to participate in helping with a solution to a local alert, and to take preventive measures to lesson the likelihood of mishappenings from occurring proximate or within the defined geographical neighborhood.

Other aspects, advantages and novel features of the present disclosure will become apparent from the following detailed description when considered in conjunction with the accompanying drawings.

BRIEF DESCRIPTION OF THE DRAWINGS

FIG. 2A illustrates a flow diagram of an exemplary method of creating a new user for local alert services in accordance with another aspect of the disclosure.

FIG. 2B illustrates a diagram of an exemplary screen associated with creating a new user for local alert services in accordance with another aspect of the disclosure.

FIG. 2C illustrates a diagram of an exemplary screen associated with logging in an existing user for local alert services in accordance with another aspect of the disclosure.

FIGS. 7B-7D illustrate diagrams of exemplary screens associated with notifying a user originating a lost child alert of the finding of the child associated with a neighborhood group in accordance with other aspects of the disclosure.

FIG. 8A illustrates a flow diagram of an exemplary method of creating a found child alert for a neighborhood group in accordance with another aspect of the disclosure.

FIG. 8B illustrates a diagram of an exemplary screen associated with creating a found child alert for a neighborhood group in accordance with another aspect of the disclosure.

DETAILED DESCRIPTION OF THE EXEMPLARY EMBODIMENTS

Figure 1:
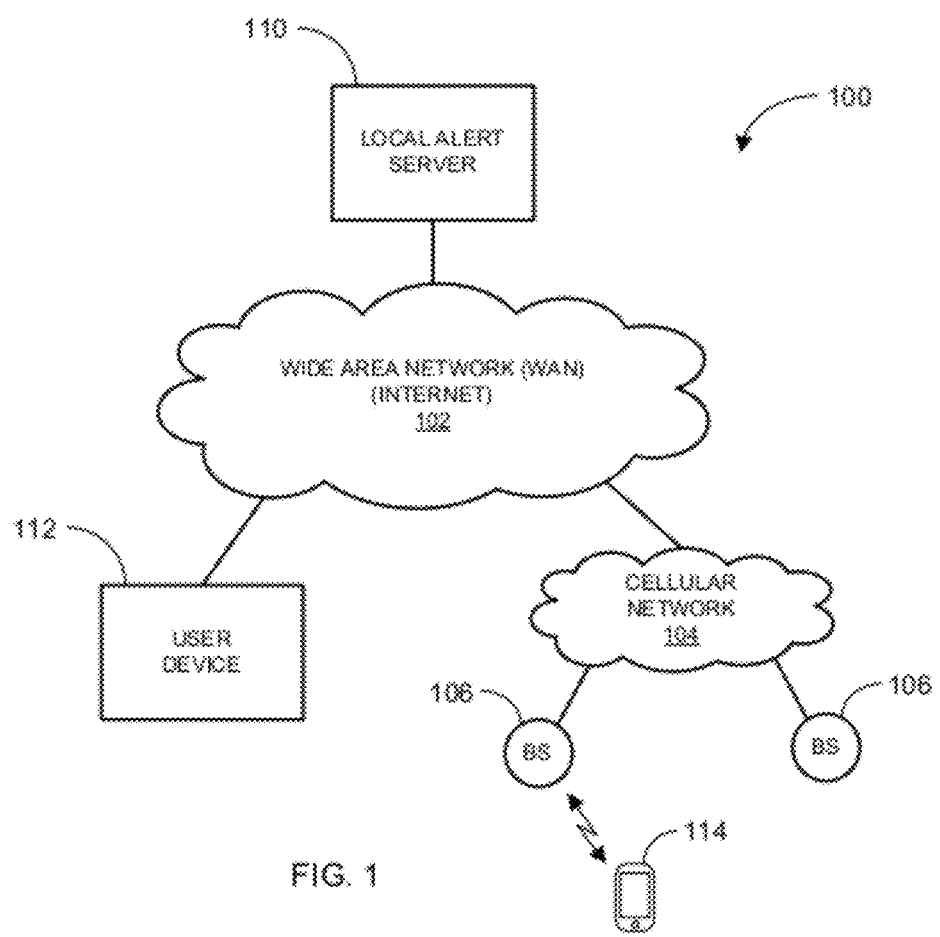
FIG. 1 illustrates a block diagram of an exemplary communication system in accordance with an aspect of the disclosure.

FIG. 1 illustrates a block diagram of an exemplary communication system 100 in accordance with an aspect of the disclosure. In summary, the communication system facilitates providing alerts and/or other information to members of a user-defined neighborhood group. In this regards, a user may create a new or join an existing neighborhood group. Each member of the neighborhood group may send alerts and/or other information to the remaining members of the neighborhood groups. Additionally, any participating law enforcement, fire station, civic leaders and/or other government agencies local to the neighborhood may receive and/or provide such alerts and information as needed. As examples, such local alerts may include missing or lost child, lost person (regardless of age, e.g., a person with Alzheimers), found child, found person (regardless of age, e.g., a person with Alzheimers) lost pet, crime, fire, gas leak, flooding, mudslide, etc. Other information may include upcoming local community events, requests for elderly/disabled care, local fund raising activities, etc.

Using the communication system 100, members of the neighborhood group, including local government agencies, may participate in the alerts. As an example, with regard to a lost child alert, members of the neighborhood group may volunteer to search for the lost child. During such alert, the local law enforcement agency may be notified of the lost child, and may decide to send an agent to investigate and help with the search. Additionally, in case the lost child is found by a member, the communication system 100 facilitates providing notification of the found child to the user that originated the lost child alert, as well as other members of the neighborhood group and participating government agency or agencies. Although as detailed below, a lost or found child alert may serve to exemplify features and advantages of a neighborhood group, it shall be understood that other alerts and information may be transmitted to members of a neighborhood group.

More specifically, as discussed in more detail below, the communication system 100 facilitates the following: (1) signing up a new user for local alert services; (2) logging in an existing user for local alert services; (3) creating or defining a new neighborhood group by a user; (4) joining an existing neighborhood group by a user; (5) adding one or more children to a user profile data object for alerts and/or other purposes; (6) creating a lost child alert by a user; (7) joining a search for a lost child by one or more user members of a neighborhood group; (8) notifying a user who originated the lost child alert of the finding of the lost child by a user member of a neighborhood group; (9) creating a found child alert by a user; (10) responding to a found child alert by a user member of a neighborhood group; (11) creating a crime alert by a user member of a neighborhood group; and (12) creating a care request by a user member of a neighborhood group.

With regard to implementation, the communication system 100 may comprise a wide area network (WAN) 102, such as the Internet, a local alert server 110 coupled to the WAN 102, a user device 112 (e.g., desktop or laps computer) coupled to the WAN 102, a cellular network 104 coupled to the WAN 102 and including a plurality of base stations (BS) 106, and a user wireless device 114 (e.g., a smart phone) communicatively coupled to one of the base stations (BS) 106. Via the WAN 102 and/or the cellular network 104, the local alert server 110 provides neighborhood alert and/or information distribution services to users using, for example, the user device 112 and the user wireless device 114. The local alert server 110 may provide such services via a website and webpages transmitted to users of devices 112 and 114, or by interacting with applications running on those devices, or any combination thereof. The detailed discussion of examples of the services provided by the local alert server 110 now follows.

FIG. 2A illustrates a flow diagram of an exemplary method 200 of creating a new user for local alert services in accordance with another aspect of the disclosure. According to the method 200, a candidate user, desiring services provided by the local alert server 110, accesses a "new user" screen using, for example, the user device 112 or device 114 (block 202).

The "new user" screen may be provided to the user device 112 or 114 via a webpage or HTML document, or may be provided by a software application running on the device 112 or 114. This applies to all of the screens mentioned herein. Using the "new user" screen, the candidate user enters particular information requested by the local alert server 110 (block 204). For example, the information requested may be the user's email address, telephone number, proposed password, and/or other information.

Then, according to the method 200, the candidate user, using the user device 112 or 114, transmits a new user requests with the information to the local alert server 110 (block 206). In the case of user device 112, the request and information are sent to the local alert server 110 by way of the WAN 102. In the case of user wireless device 114, the request and information are sent to the local alert server 110 via the cellular network 104 and the WAN 102. The transmission of information from user devices 112 and 114, as further described herein, may be communicated to the local alert server 110 via these paths.

In response to receiving the request and the user information, the local alert server 110, after determining that the request and the user information are acceptable, creates a user profile data object and stores it in a local or remote database (e.g., a computer-readable medium) (block 208). As an example, the request and user information may be accepted if the proposed password meets defined guidelines for passwords, the user email address and mobile phone number are legitimate, and the user accepted a legal agreement associated with the services provided by the local alert server 110. After creating the user profile data object, the local alert server 110 sends a "new user" confirmation with an active log-in status to the device 112 or 114 of the new user (block 210). The confirmation is sent to the user device 112 via the WAN 102 or to the wireless device 114 via the WAN 102 and the cellular network 104. The transmission of information from the local alert server 110 to the user devices 112 and 114, as further described herein, may be communicated via the these paths.

FIG. 2B illustrates a diagram of an exemplary user device screen 250 associated with creating a new user for local alert services in accordance with another aspect of the disclosure. The screen 250 comprises a title section identifying the application, for example, the "LOCAL ALERT APPLICATION." Under the title section, the screen 250 includes a sub-title indicating the purpose of the screen, for example, new user "SIGN UP." Additionally, the screen 250 provides several data input objects for receiving information requested for new users, such as user's "Email Address", "Mobile Phone", "Create Password" and "Agree to the terms" associated with the services. Finally, the screen 250 includes a data transmission object for initiating the transmission of the information to the local alert server 110, such as the "SIGN UP" soft button. It shall be understood that "new user" screen 250 is merely an example, and may be configured differently to achieve the same or similar objectives.

FIG. 2C illustrates a diagram of an exemplary user device screen 260 associated with logging in an existing user for local alert services in accordance with another aspect of the disclosure. If a user is not currently logged in the local alert server 110 for receiving services therefrom, the screen 260 may be accessed by an existing user to log in the server. Similar to the previous screen 250, the screen 260 comprises a title identifying the application, for example, the "LOCAL ALERT APPLICATION," a sub-title indicating the purpose of the screen, for example, user "LOG IN," and several data input objects for receiving log in information, such as user's "Email Address" and "Password." Additionally, the screen 260 includes a data transmission object for initiating the transmission of the log in information to the local alert server 110, such as the "LOG IN" soft button. Finally, if a candidate user accesses this screen by mistake, the screen 260 provides a link to the "SIGN UP" screen 250, previously discussed. It shall be understood that "LOG IN" screen 260 is merely an example, and may be configured differently to achieve the same or similar objectives.

Figure 3A:
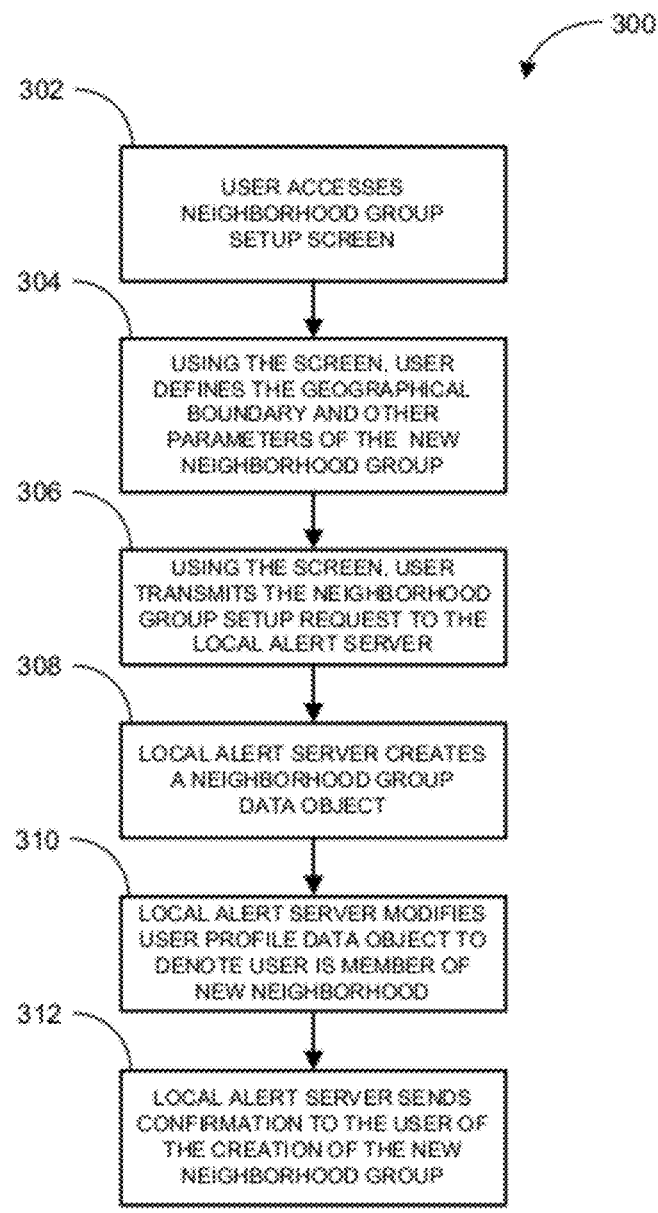
FIG. 3A illustrates a flow diagram of an exemplary method of creating a new neighborhood group for local alert services in accordance with another aspect of the disclosure.

FIG. 3A illustrates a flow diagram of an exemplary method 300 of creating a new neighborhood group for local alert services in accordance with another aspect of the disclosure. Once a user has registered with the local alert server 110, the user may create a new neighborhood group for the purpose of providing alerts and information to future members of the group. The neighborhood, as described herein, is a geographical area defined by a user that is local to where the user resides, such as a city, a neighborhood within a city, a common zip code area, or other relatively small area not defined by governmental boundaries. It is within this defined neighborhood where members of the group would be interested in alerts and information local to the corresponding neighborhood.

More specifically, according to the method 300, an existing or authorized user of the local alert server 110 accesses a "neighborhood setup" screen using the user device 112 or 114 (block 302). Using the "neighborhood setup" screen, the user defines the geographical boundary and other parameters of the proposed neighborhood group (block 304). The parameters for the new neighborhood group may include the name for the neighborhood group, the administrator of the neighborhood group, a description of the neighborhood group, and/or others. Once the user has entered the requested information, the user, using the "neighborhood setup" screen, transmits a neighborhood group setup request with the entered information to the local alert server 110 (block 306). In response to receiving and accepting the request, the local alert server 110 creates a neighborhood group data object with the geographical boundary and parameter information, and stores it in an accessible database (block 308). The local alert server 110 may also modify the user profile data object of the requesting user to denote that the user is a member of the newly-created neighborhood group (block 310). The local alert server 110 may then send a confirmation of the setup of the new neighborhood to the user device 112 or 114 of the requesting user (block 312).

Figure 3B:
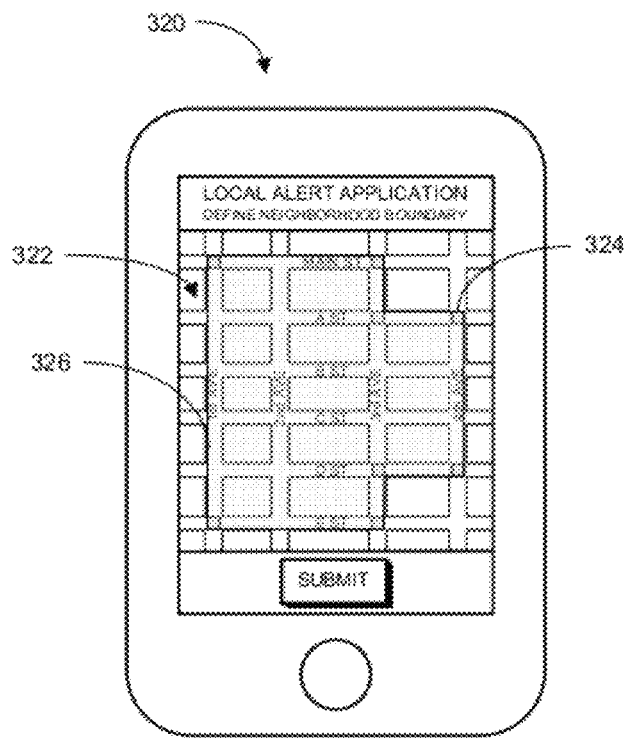
FIGS. 3B-3C illustrate diagrams of exemplary screens associated with creating a new neighborhood group for local alert services in accordance with other aspects of the disclosure.

FIG. 3B illustrates a diagram of an exemplary user device screen 320 for defining a geographical boundary associated with a new neighborhood group in accordance with another aspect of the disclosure. Similar to previous screens, the screen 320 comprises a title identifying the application, for example, the "LOCAL ALERT APPLICATION," and a sub-title indicating the purpose of the screen, for example, "DEFINE NEIGHBORHOOD BOUNDARY." Additionally, the screen 320 comprises a graphical input object 322 depicting a map of the geographical area-of-interest. A user, for example, may manipulate typical map navigation features, such as zoom-in, zoom-out, pan, or otherwise enter the user's zip code to hone in on the geographical area-of-interest for the new neighborhood group.

The graphical input object 322 includes a drawing object 324, such as squares, which may be added, dragged and removed to allow a user to define the geographical boundary 326 for the new neighborhood group. For instance, in this example, the geographical boundary is indicated by the shaded area superimposed on the map. As shown, the defined geographical area is bounded by main street (between $1^{st}$ and $3^{rd}$ avenues) and A street (between $3^{rd}$ and $4^{th}$ avenues) from the North; by 3$^{rd}$ avenue (between Main and A streets, and D and E streets) and 4$^{th}$ avenue (between A and D streets) from the East; by D street (between 3$^{rd}$ and 4$^{th}$ avenues) and E street (between 1$^{st}$ and 3$^{rd}$ avenues) from the South; and by 1$^{st}$ avenue (between Main and E streets) from the West. Finally, the screen 320 comprises a data transmission object for initiating the transmission of the geographical boundary information to the local alert server 110, such as the "SUBMIT" soft button. It shall be understood that the screen 320 is merely an example, and may be configured differently to achieve the same or similar objectives.

Figure 3C:
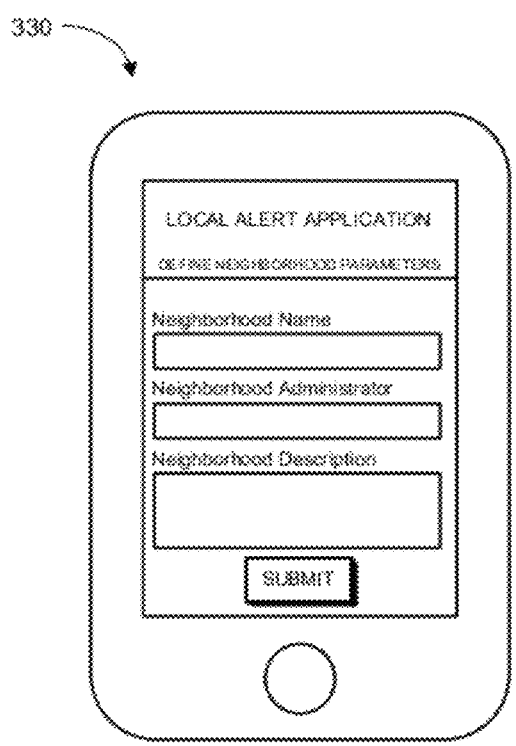

FIG. 3C illustrate a diagram of an exemplary user device screen 330 for defining other parameters of the new neighborhood group in accordance with another aspect of the disclosure. Similar to the previous screens, the screen 330 comprises a title identifying the application, for example, the "LOCAL ALERT APPLICATION," and a sub-title indicating the purpose of the screen, for example, "DEFINE NEIGHBORHOOD PARAMETERS." Additionally, the screen 330 includes data input objects for receiving neighborhood group parameter information, such as "Neighborhood Name", "Neighborhood Administrator", and "Neighborhood Description." Finally, the screen 330 comprises a data transmission object for initiating the transmission of the neighborhood group parameter information to the local alert server 110, such as the "SUBMIT" soft button. It shall be understood that the screen 330 is merely an example, and may be configured differently to achieve the same or similar objectives.

Figure 3D:
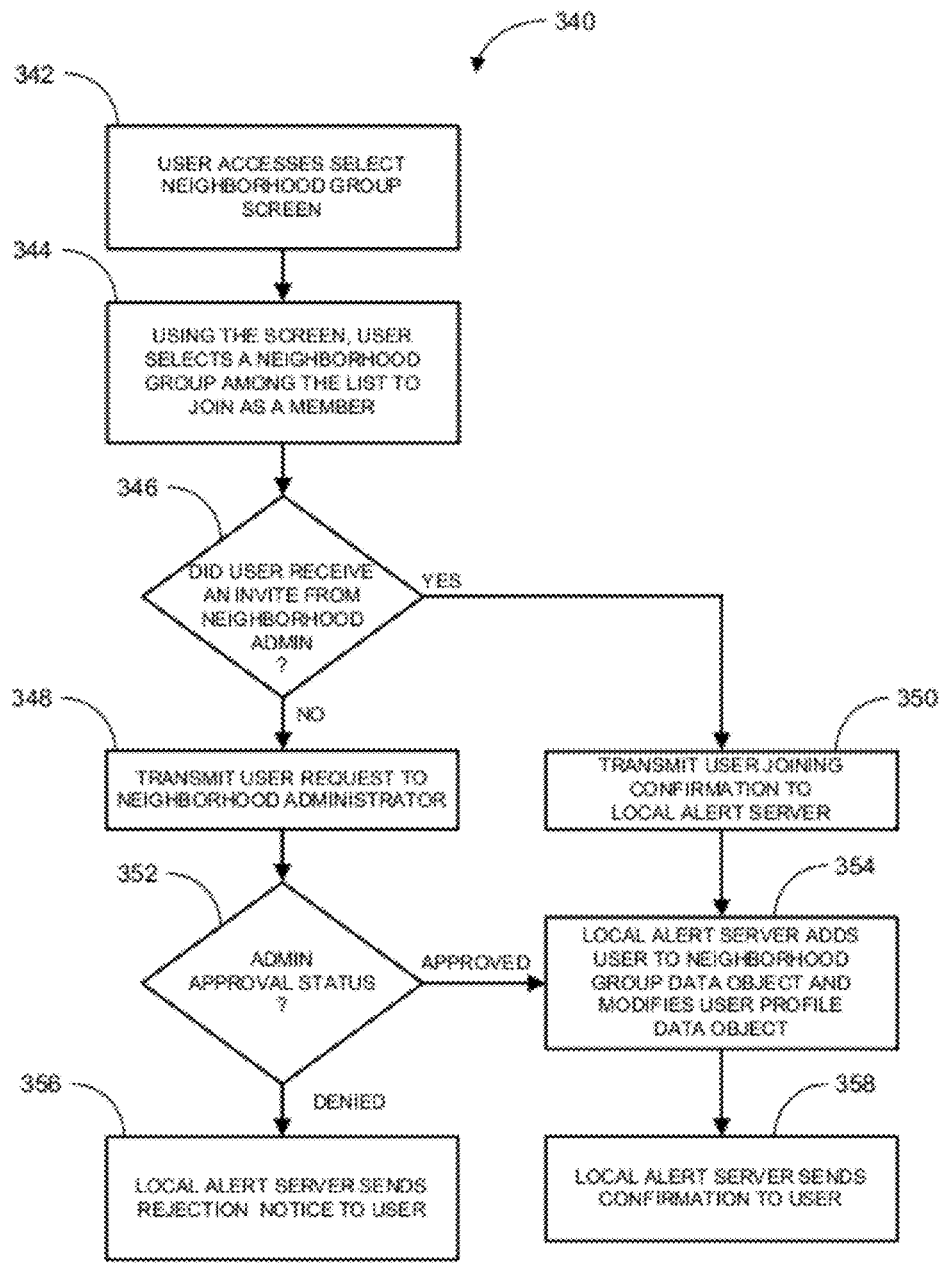
FIG. 3D illustrates a flow diagram of an exemplary method of joining an existing neighborhood group for local alert services by a user in accordance with another aspect of the disclosure.

FIG. 3D illustrates a flow diagram of an exemplary method 340 of joining an existing neighborhood group for local alert services by a user in accordance with another aspect of the disclosure. In this scenario, other users have previously created neighborhood groups that are-of-interest to the current user. That is, these previously-created neighborhood groups are probably in the vicinity of where the current user resides. Accordingly, instead of creating a new neighborhood group, the current user may opt to search for neighborhood groups that are of interests, and select one or more of such groups to requests membership therein.

In this regard, according to the method 340, the user accesses a "select neighborhood group" screen using the user device 112 or 114 (block 342). Based on the user's profile information (e.g., resident zip code), the "select neighborhood" screen may pre-populate a list of candidate neighborhood groups that would be of interest to the user. Using the screen, the user selects a neighborhood group among the list to join as a member (block 344). Based on the selection, the user device 112 or 114 may determine whether the user has previously received an invite from the administrator of the selected neighborhood group (block 346). If the user has already received the invite, then the user device 112 or 114 transmits a joining confirmation to the local alert server 110 (block 350). In response to receiving the joining confirmation, the local alert server 110 modifies the corresponding neighborhood group data object to indicate the user as a member, and modifies the user profile data object to indicate that the user is now a member of the selected neighborhood group (block 354). The local alert server also sends a confirmation to the user that he/she is now a member of the requested neighborhood group (block 358).

If, on the other hand, the user device 112 or 114 determines that the administrator has not sent an invite to the user in block 346, the user device transmits a requests to the indicated neighborhood administrator by way of the local alert server 110 (block 348). Then, the local alert server 110 determines if it has received the approval from the neighborhood administrator (block 352). If it has, then the local alert server 110 modifies the corresponding neighborhood group data object to indicate the user as a member, and modifies the user profile data object to indicate that the user is now a member of the selected neighborhood group (block 354), and notifies the user per block 358. If, on the other hand, the local alert server 110 determines that the membership request was denied by the neighborhood administrator, the local alert server sends a rejection notice to the user device 112 or 114 (block 356). The local alert server 110 may indicate that the membership request has been denied by either receiving an affirmative denial from the neighborhood administrator, or not receiving a response to the request from the neighborhood administrator within a defined time period after the request was issued (e.g., the request has timed-out).

Figure 3E:
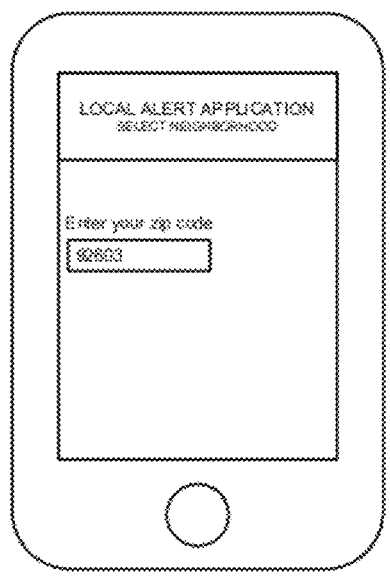
FIGS. 3E-3I illustrate diagrams of exemplary screens associated with joining an existing neighborhood group for local alert services in accordance with other aspects of the disclosure.

FIG. 3E illustrates a diagram of an exemplary user device screen 360 associated with a user joining an existing neighborhood group in accordance with another aspect of the disclosure. This screen 360 may be presented to the user in order to filter out neighborhood groups that would probably not be of interest to the user, and present the user a list of neighborhoods that may be of interest to the user based on where he/she resides. More specifically, the screen 360 comprises a title identifying the application, for example, the "LOCAL ALERT APPLICATION," and a sub-title indicating the purpose of the screen, for example, "SELECT NEIGHBORHOOD." Additionally, the screen 360 includes a data input object adapted to receive a zip code (e.g., 92603) associated with the resident of the user. Using the zip code, the user device 112 or 114 may filter out neighborhood groups that are geographically located a defined distance beyond the relevant zip code, and present a list of neighborhood groups that are geographically located within the defined distance from the relevant zip code. It shall be understood that the screen 360 is merely an example, and may be configured differently to achieve the same or similar objectives.

Figure 3F:
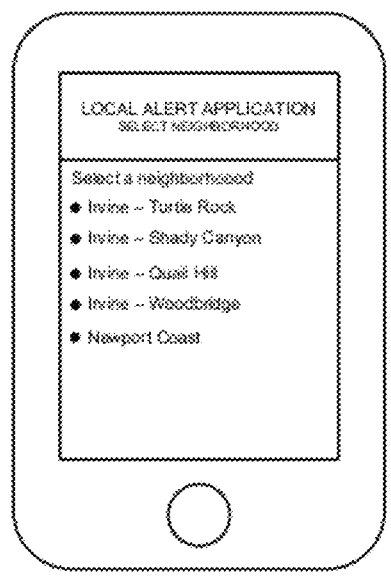

FIG. 3F illustrates a diagram of an exemplary user device screen 365 associated with a user joining an existing neighborhood group in accordance with another aspect of the disclosure. After the user has entered his/her zip code, the user device 112 or 114 may present a list of neighborhood groups that may be of interest to the user based on the entered zip code. More specifically, the screen 365 comprises a title identifying the application, for example, the "LOCAL ALERT APPLICATION," and a sub-title indicating the purpose of the screen, for example, "SELECT NEIGHBORHOOD." Additionally, the screen 365 includes a data input object in the form of a list of selectable neighborhood groups. For instance, in this example, the identified groups include Irvine-Turtle Rock, Irvine-Shady Canyon, Irvine-Quail Hill, Irvine-Woodbridge, and Newport Coast. In response to a selection made by the user, the user device 112 or 114 transmits a corresponding membership request to the local alert server 110 for approval or denial by the neighborhood administrator. It shall be understood that the screen 365 is merely an example, and may be configured differently to achieve the same or similar objectives.

Figure 3G:
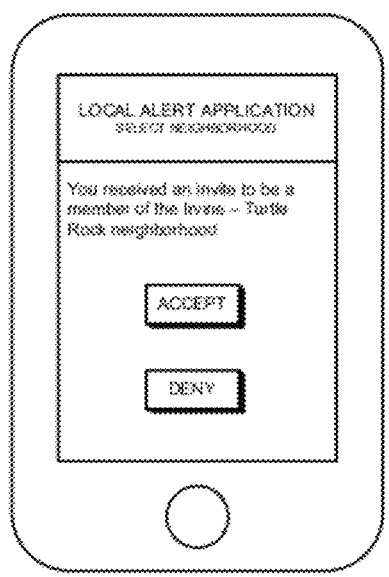

FIG. 3G illustrates a diagram of an exemplary user screen 370 associated with a user joining an existing neighborhood group in accordance with another aspect of the disclosure. In the previous examples, the user initiated the process of selecting a neighborhood group. However, it shall be understood that the process may be initiated by the neighborhood administrator sending an invite to the user. Screen 370 is relevant to this scenario. More specifically, the screen 370 comprises a title identifying the application, for example, the "LOCAL ALERT APPLICATION," and a sub-title indicating the purpose of the screen, for example, "SELECT NEIGHBOR- HOOD." Additionally, the screen 370 includes a statement indicating that the user has been invited to be a member of a particular neighborhood group (e.g., Irvine-Turtle Rock), and a data input object to allow the user to accept or deny the invitation. It shall be understood that the screen 370 is merely an example, and may be configured differently to achieve the same or similar objectives.

Figure 3H:
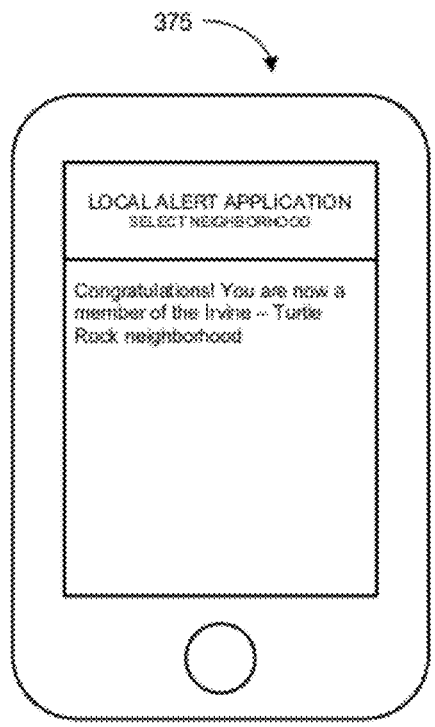

FIG. 3H illustrates a diagram of an exemplary user device screen 375 associated with a user joining an existing neighborhood group in accordance with another aspect of the disclosure. Once a user has sent a request for membership in a particular neighborhood group or has accepted an invitation to the neighborhood group, the local alert server 110 may send a confirmation of membership in the group to the user. Screen 375 is relevant to this scenario. More specifically, the screen 375 comprises a title identifying the application, for example, the "LOCAL ALERT APPLICATION," and a sub-title indicating the purpose of the screen, for example, "SELECT NEIGHBORHOOD." Additionally, the screen 375 includes a statement indicating that the user has been accepted to the requested or invited neighborhood group (e.g., Irvine-Turtle Rock). It shall be understood that the screen 375 is merely an example, and may be configured differently to achieve the same or similar objectives.

Figure 3I:
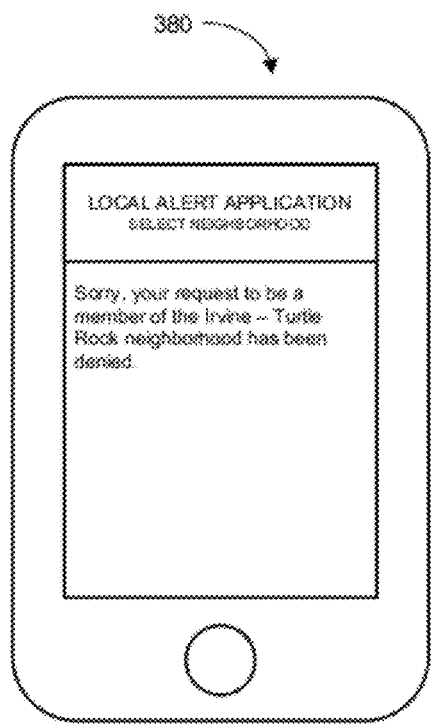

FIG. 3I illustrates a diagram of an exemplary user device screen 380 associated with a user joining an existing neighborhood group in accordance with another aspect of the disclosure. Once a user has sent a request for membership in a particular neighborhood group, the local alert server 110 may inform the user that membership to the requested neighborhood group has been denied. Screen 380 is relevant to this scenario. More specifically, the screen 380 comprises a title identifying the application, for example, the "LOCAL ALERT APPLICATION," and a sub-title indicating the purpose of the screen, for example, "SELECT NEIGHBORHOOD." Additionally, the screen 380 includes a statement indicating that the user has been denied membership to the requested neighborhood group (e.g., Irvine-Turtle Rock). It shall be understood that the screen 380 is merely an example, and may be configured differently to achieve the same or similar objectives.

Figure 4A:
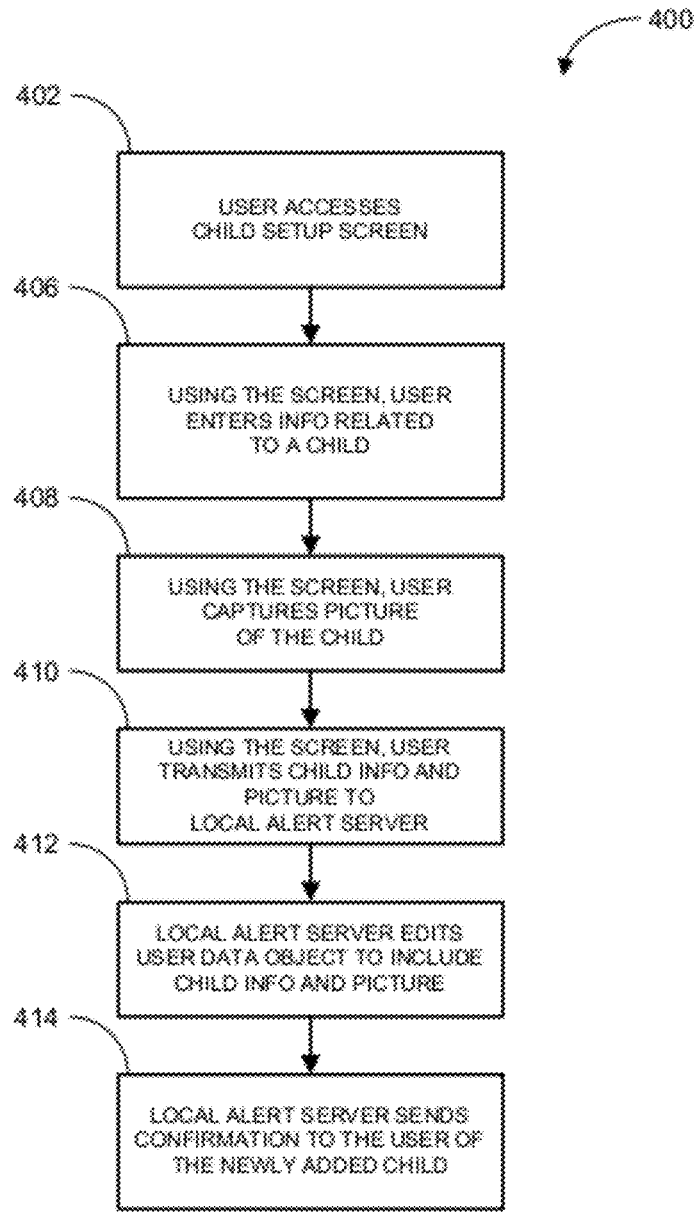
FIG. 4A illustrates a flow diagram of an exemplary method of adding a child to a user profile for local alert services in accordance with another aspect of the disclosure.

FIG. 4A illustrates a flow diagram of an exemplary method 400 of adding a child to a user profile data object for local alert services in accordance with another aspect of the disclosure. One advantage, among many, for being a member of a neighborhood group is that one may send an alert concerning one's child to the group in order to get assistance from group members concerning the nature of the alert. As further exemplified in more detail herein, one such alert may concern a lost child. Accordingly, members of the neighborhood group, in being notified of a lost child alert, may volunteer in searching for the child, as well as reporting back to the group if and when the child is found. To assist a user in sending alerts regarding his/her child or children, the user profile data object may be modified to include information and an electronic picture or video of his/her child or children. The method 400 is relevant to this scenario.

According to the method 400, a user accesses a "child setup" screen on the user device 112 or 114 (block 402). Using the screen, the user enters information related to a child (block 404). For example, such information may include child's name, gender, date of birth, and/or other information. Additionally, using a data input object on the screen, the user inputs an electronic picture (or video) of the child (block 408). This may be accomplished by the user taking a picture of the child using a camera built into the user device 112 or 114, or retrieving a preexisting picture of the child from a memory residing in the user device 112 or 114. Further, using the screen, the user may then transmit the child information and picture (or video) to the local alert server 110 (block 410). The local alert server 110 then modifies the user profile data object to include the child information and electronic picture (or video) (block 412). The local alert server 110 may then send a confirmation to the user indicating that the child was successfully added to the user's profile (block 414). The method 400 may be repeated, as needed, to add additional child or children to the user's profile.

Figure 4B:
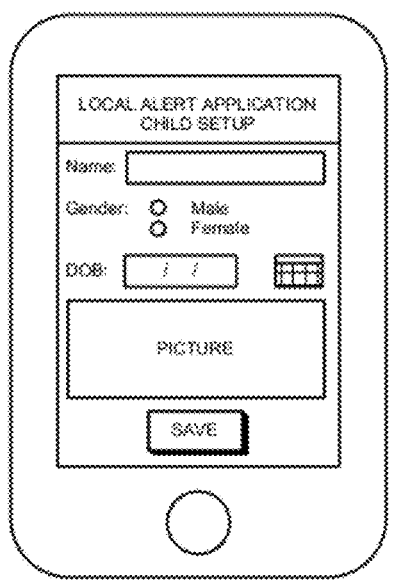
FIGS. 4B-4E illustrate diagrams of exemplary screens associated with adding a child to a user profile for local alert services in accordance with other aspects of the disclosure.

FIG. 4B illustrates a diagram of an exemplary user device screen 420 associated with adding a child to a user profile data object in accordance with another aspect of the disclosure. The screen 420 may be the first screen a user accesses to begin the processes of adding a child to his/her profile. More specifically, the screen 420 comprises a title identifying the application, for example, the "LOCAL ALERT APPLICATION," and a sub-title indicating the purpose of the screen, for example, "CHILD SETUP." Additionally, the screen 420 includes data input objects adapted to receive the name, gender and data-of-birth of the child. Additionally, the screen 420 includes a data input object to receive an electronic picture (or video) of the child. Finally, the screen 420 includes a data transmission object (e.g., the "SAVE" soft button) adapted to transmit the child information and picture to the local alert server 110. It shall be understood that the screen 420 is merely an example, and may be configured differently to achieve the same or similar objectives.

Figure 4C:
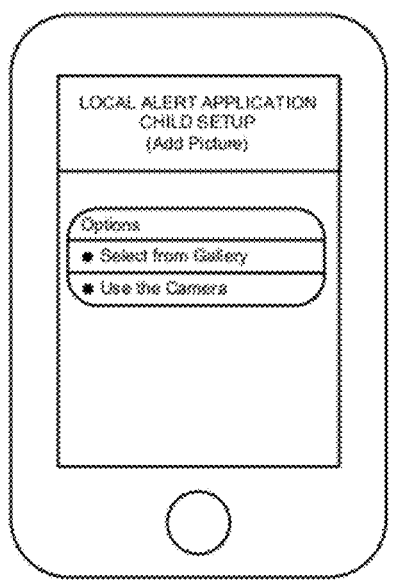

FIG. 4C illustrates a diagram of an exemplary user device screen 430 associated with adding a child to a user profile data object in accordance with another aspect of the disclosure. The screen 430 may be presented in response to a user activating the picture input object of screen 420. More specifically, the screen 430 comprises a title identifying the application, for example, the "LOCAL ALERT APPLICATION," and a sub-title indicating the purpose of the screen, for example, "CHILD SETUP (Add Picture)." Additionally, the screen 430 includes a data input object adapted to receive a selection from the user as to the source of the child's picture. In this example, the screen 430 allows a user to select the gallery or memory as the source of the child's picture, or to select the camera as the source of the child's picture. It shall be understood that the screen 430 is merely an example, and may be configured differently to achieve the same or similar objectives.

Figure 4D:
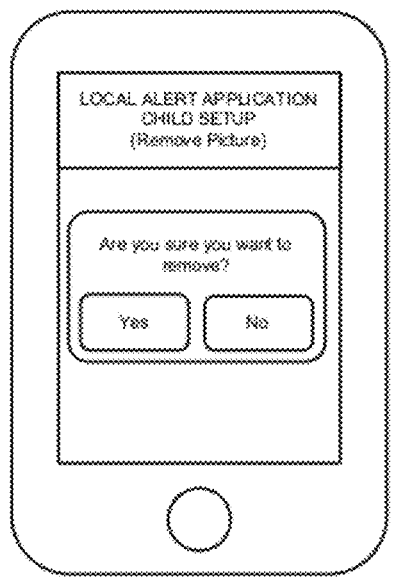

FIG. 4D illustrates a diagram of an exemplary user device screen 440 associated with adding a child to a user profile data object in accordance with another aspect of the disclosure. The screen 440 allows a user to remove a child picture from his/her profile. This may be useful if the current pictures in the profile are old, and do not accurately represent the current appearance of the child. This screen 440 may be presented to the user after a particular picture of the child has been selected for removal. More specifically, the screen 440 comprises a title identifying the application, for example, the "LOCAL ALERT APPLICATION," and a sub-title indicating the purpose of the screen, for example, "CHILD SETUP (Remove Picture)." Additionally, the screen 440 includes a data input object adapted to receive a confirmation or not from the user as to the removal of the selected child picture. It shall be understood that the screen 440 is merely an example, and may be configured differently to achieve the same or similar objectives.

Figure 4E:
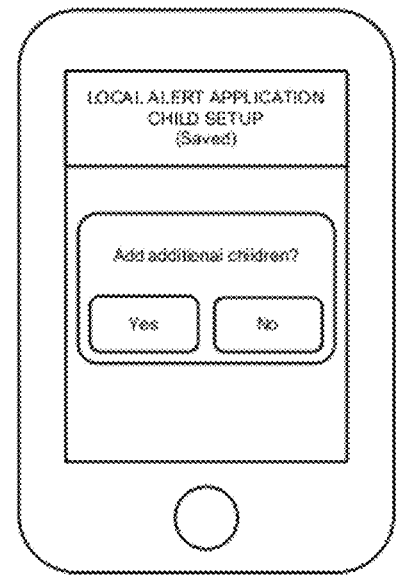

FIG. 4E illustrates a diagram of an exemplary user device screen 450 associated with adding a child to a user profile data object in accordance with other aspects of the disclosure. The screen 450 facilitates a user to transmit a child information and picture to the local alert server 110 for the purpose of adding the child to the user's profile. More specifically, the screen 450 comprises a title identifying the application, for example, the "LOCAL ALERT APPLICATION," and a sub-title indicating the purpose of the screen, for example, "CHILD SETUP (Saved)." Additionally, the screen 450 includes a data input object adapted to receive an indication from the user as to whether to add additional one or more children to the user's profile. If the user indicates in the affirmative, the process of adding the child information and picture is repeated for the next child. It shall be understood that the screen 450 is merely an example, and may be configured differently to achieve the same or similar objectives.

Figure 5A:
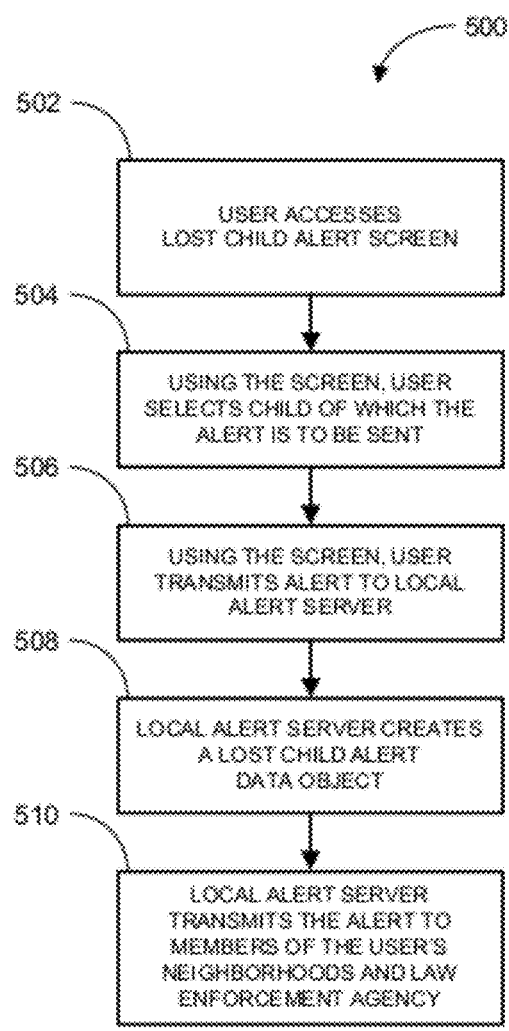
FIG. 5A illustrates a flow diagram of an exemplary method of creating a lost child alert for a neighborhood group in accordance with another aspect of the disclosure.

FIG. 5A illustrates a flow diagram of an exemplary method 500 of creating a lost child alert for a neighborhood group in accordance with another aspect of the disclosure. The method 500 is applicable when a member of a neighborhood group has a missing child, and needs the assistance of other members of the group, as well as local law enforcement, in locating the child. In receiving the lost child alert, the other members and the participating law enforcement agency, should have current information and picture of the child to better assist them in locating the child.

More specifically, a user, with the missing child, accesses a "lost child alert" screen provided by the user device 112 or 114 (block 502). Using the screen, the user selects the child of which the alert is to be sent (block 504). Further, using the screen, the user transmits the alert to the local alert server 110 (block 506). In response to receiving the alert, the local alert server 110 creates a lost child alert data object to keep track of information relevant to the alert (block 508). Then, the local alert server 110 transmits the alerts to members of the one or more neighborhood groups of which the user is member, as well as any law enforcement agency associated with the one or more neighborhood groups (block 510).

Figure 5B:
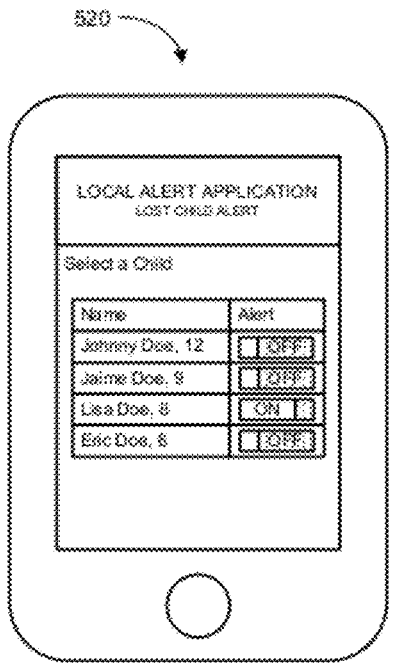
FIGS. 5B-5H illustrate diagrams of exemplary screens associated with creating a lost child alert for a neighborhood group in accordance with other aspects of the disclosure.

FIG. 5B illustrates a diagram of an exemplary user device screen 520 associated with creating a lost child alert in accordance with another aspect of the disclosure. In particular, the screen 520 facilitates a user in selecting a child of which the lost child alert is to be transmitted. More specifically, the screen 520 comprises a title identifying the application, for example, the "LOCAL ALERT APPLICATION," and a sub-title indicating the purpose of the screen, for example, "LOST CHILD ALERT." Additionally, the screen 520 includes a data input object to receive a selection of a child of which the lost child alert is to be created. In this example, the screen 520 indicates that the user has four (4) children in his/her profile (namely, Johnny Doe, Jaime Doe, Lisa Doe, and Eric Doe). Also, in this example, the alert button is activated for Lisa Doe, and not the other children. Thus, Lisa Doe is the child pertaining to the lost child alert. It shall be understood that the screen 520 is merely an example, and may be configured differently to achieve the same or similar objectives.

Figure 5C:
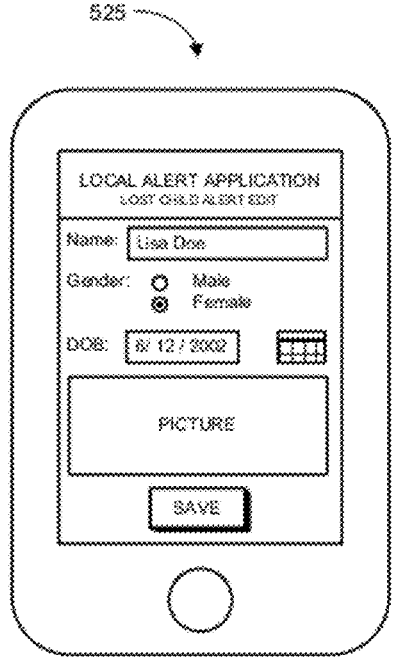

FIG. 5C illustrates a diagram of an exemplary user device screen 525 associated with creating a lost child alert in accordance with another aspect of the disclosure. In particular, the screen 525 facilitates a user in editing the lost child's information and picture before the alert is sent. For example, this screen 525 may be presented to the user in response to the user clicking the child's name in screen 520. More specifically, the screen 525 comprises a title identifying the application, for example, the "LOCAL ALERT APPLICATION," and a sub-title indicating the purpose of the screen, for example, "LOST CHILD ALERT EDIT." Additionally, the screen 525 includes data input objects adapted to receive edits to the name, gender, and date-of-birth of the child. Additionally, the screen 525 includes a data input object to receive a picture (or video) of the child. Accordingly, this screen 525 helps a user to ensure that the information and picture of the child is current when the alert is sent. Finally, the screen 525 includes a data transmission object (e.g., the "SAVE" soft button) adapted to transmit the edits to the child information and picture (or video) to the local alert server 110. It shall be understood that the screen 525 is merely an example, and may be configured differently to achieve the same or similar objectives.

Figure 5D:
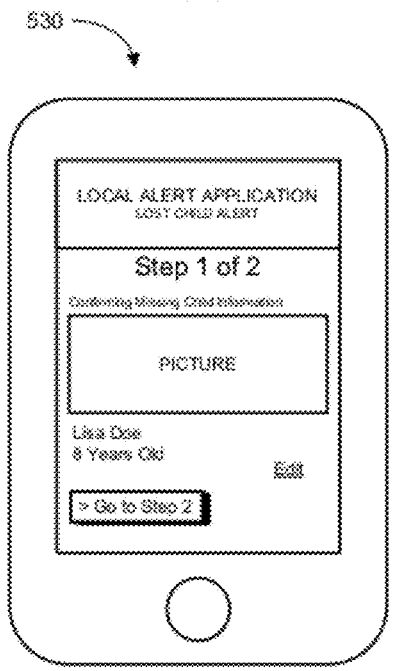

FIG. 5D illustrates a diagram of an exemplary user device screen 530 associated with creating a lost child alert in accordance with another aspect of the disclosure. In particular, the screen 530 facilitates a user to confirm the sending of the lost child alert. This screen 530 may be presented to the user in response to the user initiating the alert via the screen 520. More specifically, the screen 530 comprises a title identifying the application, for example, the "LOCAL ALERT APPLICATION," and a sub-title indicating the purpose of the screen, for example, "LOST CHILD ALERT." Also, the screen 530 may indicate that this is the first of two screens for completing the lost child alert process. Additionally, the screen 530 includes the information (e.g., Lisa Doe, 8 years old) and a picture of the child. Further, the screen 530 includes an edit link adapted to display the edit child screen 525, previously discussed. Finally, the screen 530 includes a soft button (e.g., >Go to Step 2) to allow the user to navigate to the next screen concerning the confirmation of the lost child alert. It shall be understood that the screen 530 is merely an example, and may be configured differently to achieve the same or similar objectives.

Figure 5E:

FIG. 5E illustrates a diagram of an exemplary user device screen 535 associated with creating a lost child alert in accordance with another aspect of the disclosure. In particular, the screen 535 is an example of the second screen that facilitates a user confirming the transmission of the lost child alert. This screen 535 may be presented to the user in response to the user activating the "Go to Step 2" soft button of screen 530. More specifically, the screen 535 comprises a title identifying the application, for example, the "LOCAL ALERT APPLICATION," and a sub-title indicating the purpose of the screen, for example, "LOST CHILD ALERT." Also, the screen 535 may indicate that this is the second of two screens for completing the lost child alert process. Additionally, the screen 535 may also include a first data input object (e.g., a scroll-down menu) to receive the child's last known location via a selection by the user, a second data input object (e.g., a text box) to receive a description from the user concerning the child's last known location, and a third data input object (e.g., another text box) to receive other relevant information (e.g., the clothes the child was wearing) from the user. Finally, the screen 530 includes a data transmission object (e.g., Activate Missing Child Alert) to allow the user to transmit the child alert with the relevant information to the local alert server 110. It shall be understood that the screen 530 is merely an example, and may be configured differently to achieve the same or similar objectives.

Figure 5F:
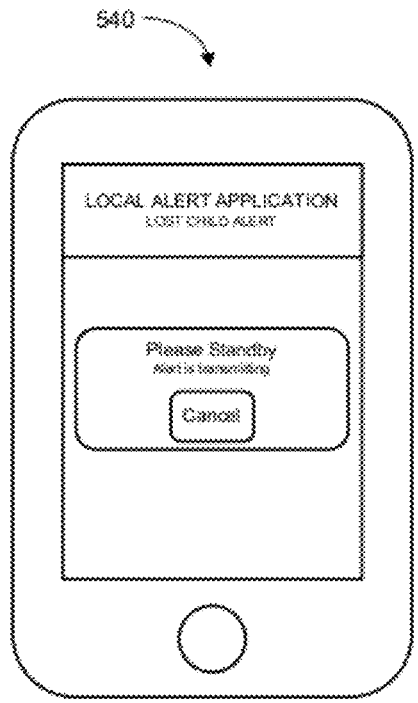

FIG. 5F illustrates a diagram of an exemplary user device screen 540 associated with creating a lost child alert in accordance with another aspect of the disclosure. The screen 540 may be presented to the user after he/she has transmitted the lost child alert to the local alert server 110, and allows the user an opportunity to cancel the alert. This may be useful in the case the user finds the child shortly after transmitting the lost child alert. More specifically, the screen 540 comprises a title identifying the application, for example, the "LOCAL ALERT APPLICATION," and a sub-title indicating the purpose of the screen, for example, "LOST CHILD ALERT." Also, the screen 540 provides an indication that the alert is being transmitted, and an object (e.g., Cancel) for initiating a cancellation of a previously-transmitted alert. It shall be understood that the screen 540 is merely an example, and may be configured differently to achieve the same or similar objectives.

Figure 5G:
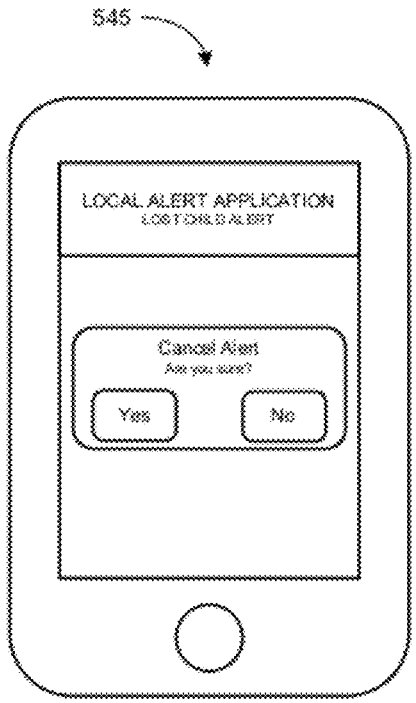

FIG. 5G illustrates a diagram of an exemplary user device screen 545 associated with creating a lost child alert in accordance with another aspect of the disclosure. The screen 545 may be presented to the user after he/she has activated the cancel button of screen 540 to allow the user to confirm whether the alert is to be cancelled. More specifically, the screen 545 comprises a title identifying the application, for example, the "LOCAL ALERT APPLICATION," and a sub-title sub-section indicating the purpose of the screen, for example, "LOST CHILD ALERT." Also, the screen 545 provides a data transmission object (e.g., Yes) to confirm the transmission of the alert cancellation to the local alert server 110, and an input object (e.g., No) to halt the alert cancellation. It shall be understood that the screen 545 is merely an example, and may be configured differently to achieve the same or similar objectives.

Figure 5H:
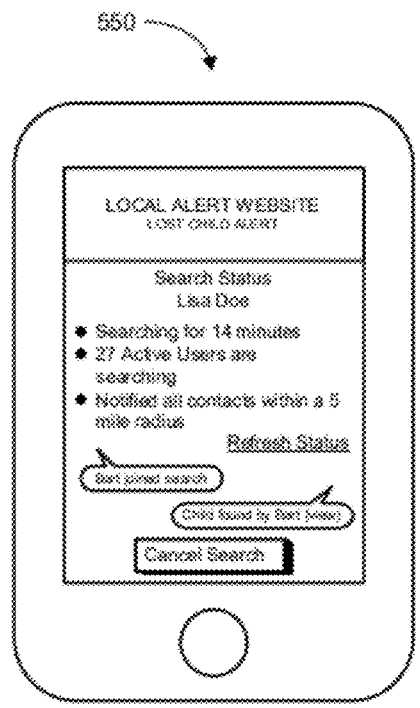

FIG. 5H illustrates a diagram of an exemplary user device screen 550 associated with a lost child alert in accordance with another aspect of the disclosure. The screen 550 may be presented to the user after the local alert server 110 has issued the lost child alert. The screen 550 provides the user originating the alert with a current status of the lost child alert. More specifically, the screen 550 comprises a title identifying the application, for example, the "LOCAL ALERT APPLICATION," and a sub-title indicating the purpose of the screen, for example, "LOST CHILD ALERT." The screen 550 further provides information as to the status of the lost child, for example, the time that has elapsed since the alert was issued (e.g., Searching for 14 minutes), the number of users searching for the child (e.g., 27 Active Users are searching), and the radius of users to which the alert was sent (e.g., Notified all contacts within a 5 mile radius). Thus, the alert may be sent to all members of the neighborhood group or those members that reside within a defined radius of the user.

Additionally, the screen 550 may provide a data transmission object (e.g., Refresh Status) for transmitting a request for current information concerning the alert to the local alert server 110. In response to the request, the local alert server 110 accesses the corresponding lost child alert data object for current information concerning the alert, and transmits the current information to the user device 112 or 114. Furthermore, the screen 550 provides "real-time" information (e.g., pop-ups) indicating updates to the search status (e.g., Bart joined search and Child found by Bart (view)). If one of these "real-time" pop-ups indicate that the child has been found, it may also serve as a data transmission object for transmitting a request for information concerning the found child. Finally, the screen 550 includes another data transmission object (e.g., Cancel Search) to transmit a cancel alert request to the local alert server 110. This allows the user to cancel the alert in case the child is found. It shall be understood that the screen 550 is merely an example, and may be configured differently to achieve the same or similar.

Figure 6A:
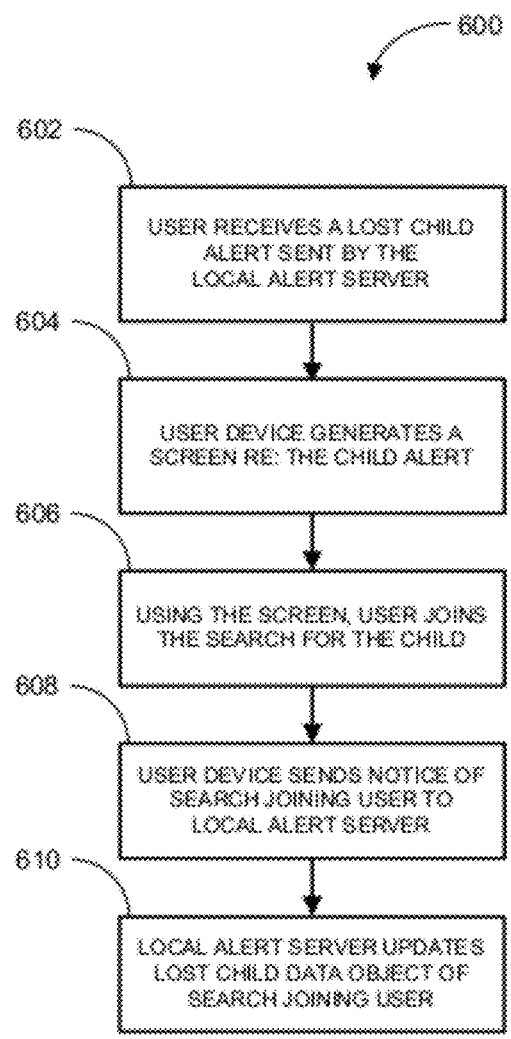
FIG. 6A illustrates a flow diagram of an exemplary method of joining a search effort for a lost child alert associated with a neighborhood group in accordance with another aspect of the disclosure.

FIG. 6A illustrates a flow diagram of an exemplary method 600 of joining a search for a lost child alert associated with a neighborhood group in accordance with another aspect of the disclosure. As previously discussed, one advantage of a neighborhood group is that alerts may be sent to the members to have at least some of them assist in resolving the alert. In this regard, the method 600 describes how a member, that has received a lost child alert, may participate in the search for the missing child.

According to the method 600, a user receives a notification of a lost child alert on the user device 112 or 114 from the local alert server 110 (block 602). In response to the received alert, the user device 112 or 114 generates a screen concerning the lost child alert (block 604). For example, such screen may provide information about the lost child (e.g., name, gender, age, etc.), as well as an electronic picture of the child. Additionally, the screen may provide a data transmission object to allow the user to transmit a notice to the local alert server 110 that he/she will participate in the search for the missing child. Accordingly, using the screen, the user indicates that he/she will join the search (block 606). In response, the user device 112 or 114 transmits the notice that the user has joined the search for the child to the local alert server 110 (block 608). In response to receiving the notification, the local alert server 110 updates the lost child data object to indicate that the user has joined the search (block 610). Such information in the lost child data object may be accessed by the member that issued the alert, as well as other members and participating local law enforcement agency.

Figure 6B:
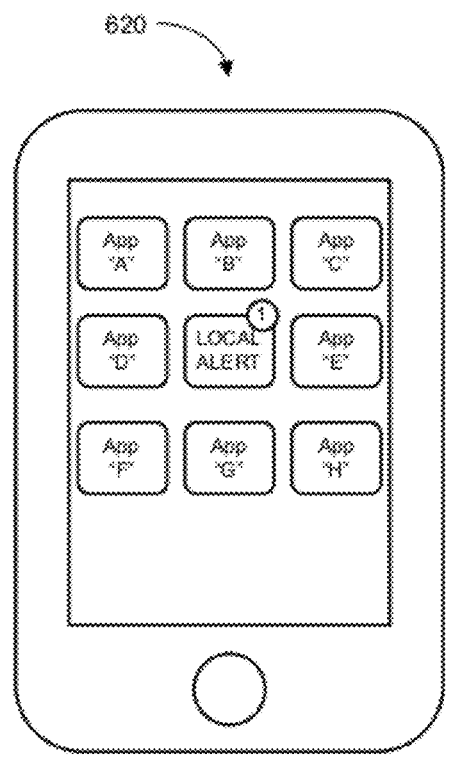
FIGS. 6B-6C illustrate diagrams of exemplary screens associated with joining a search effort for a lost child alert associated with a neighborhood group in accordance with other aspects of the disclosure.

FIGS. 6B illustrate a diagram of an exemplary user device screen 620 associated with a lost child alert in accordance with other aspects of the disclosure. The screen 620 may be an exemplary "desktop" screen depicting the available applications on the user device 112 or 114. As indicated, the screen 620 includes a graphical icon representing the local alert application. In addition, a graphical object (e.g., the number "1" encircled) superimposed on the application icon may be used to summons the user of pending alerts. For instance, in this example, the graphical object indicates that there is one (1) pending alert. The user may then open the local alert application in order to ascertain the details concerning the alert. It shall be understood that the screen 620 is merely an example, and may be configured differently to achieve the same or similar objectives.

Figure 6C:
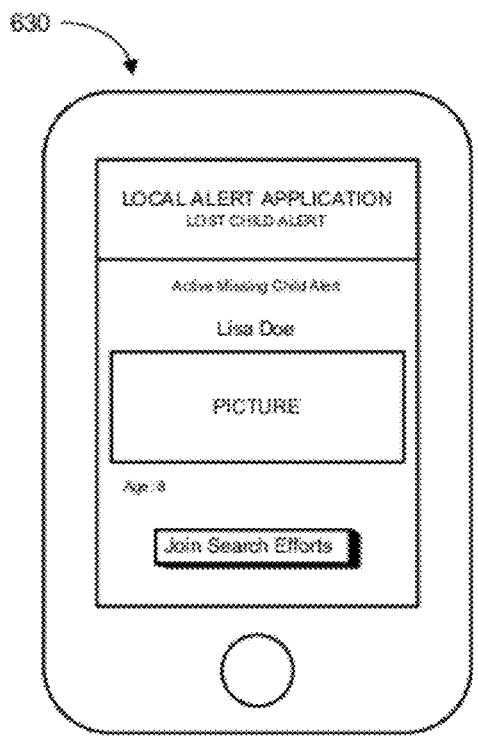

FIG. 6C illustrates a diagram of an exemplary user device screen 630 associated with a lost child alert in accordance with another aspect of the disclosure. In particular, the screen 630 provides information to a user, that did not originate the alert, concerning an active lost child alert. More specifically, the screen 630 comprises a title identifying the application, for example, the "LOCAL ALERT APPLICATION," and a sub-title indicating the purpose of the screen, for example, "LOST CHILD ALERT." Also, the screen 630 may indicate an additional sub-title "Active Missing Child Alert." Further, the screen 630 includes information concerning the lost child (e.g., Lisa Doe, 8 years old) and an electronic picture of the child. Finally, the screen 630 includes a data transmission object (e.g., Join Search Efforts) for transmitting a notification to the local alert server 110 that the user is going to join the search for the missing child. It shall be understood that the screen 630 is merely an example, and may be configured differently to achieve the same or similar objectives.

Figure 7A:
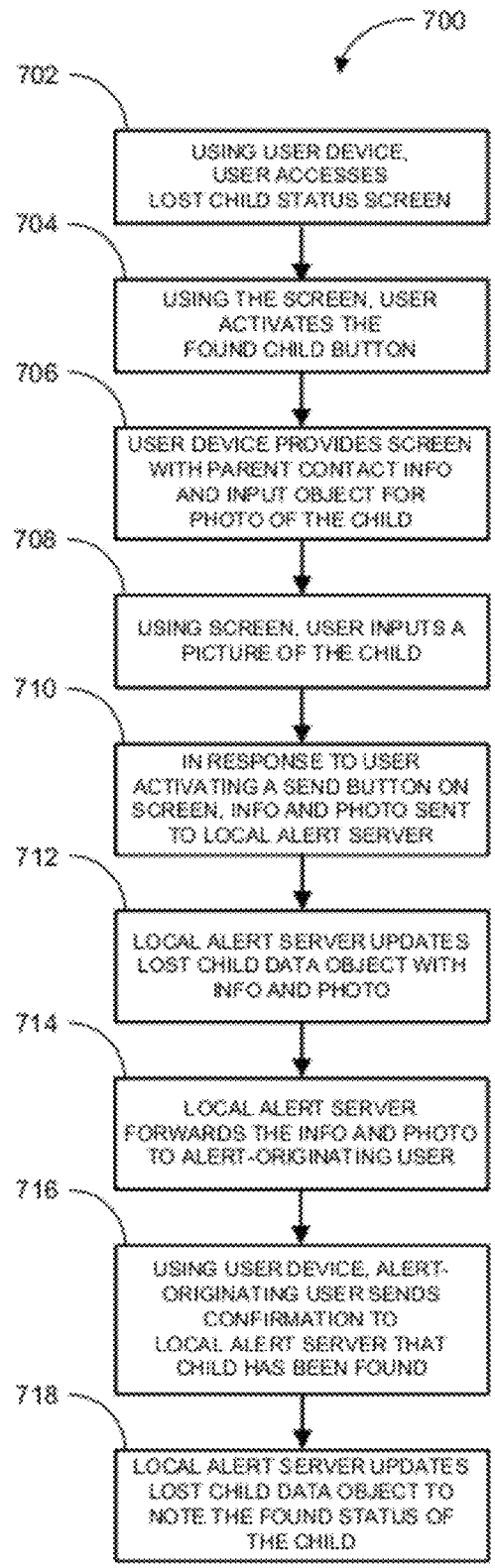
FIG. 7A illustrates a flow diagram of an exemplary method of notifying a user originating a lost child alert of the finding of the child associated with a neighborhood group in accordance with another aspect of the disclosure.

FIG. 7A illustrates a flow diagram of an exemplary method 700 of notifying a user originating a lost child alert of the finding of the child in accordance with another aspect of the disclosure. Obviously, a favorable outcome of the lost child alert is the finding of the missing child. As previously discussed, the local alert server 110 assists in achieving such a favorable outcome by communicating the lost child alert to members of neighborhood group. Also, as previously discussed, members of the neighborhood group are able to join the search efforts for the missing child. Accordingly, method 700 is applicable when a member has found the missing child.

More specifically, according to the method 700, a user accesses a "lost child status screen" using the user device 112 or 114 (block 702). Using the screen, the user activates a found child soft button (block 704). In response, the user device 112 or 114 generates a screen indicating the contact information of the user originating the alert, and including an input object to receive an electronic photograph of the child (block 706). At such time, the user may contact the user originating the alert. Alternatively, or in addition to, the user may input an electronic picture of the child using the input object (block 708). In response to the user activating a send button on the screen, the child picture and current location (e.g., by accessing a GPS module located on the user device 112 or 114) are sent to the local alert server 110 (block 710). The local alert server 110 updates the lost child data object with the received information and picture (block 712), and sends the information and picture to the user originating the alert (block 714). The alert-originating user may send a notification to the local alert server 110 confirming the identity of the child (block 716). The local alert server 110 then updates the lost child data object to indicate the finding of the child (block 718).

FIG. 7B illustrates a diagram of an exemplary user device screen 730 associated with a lost child alert in accordance with another aspect of the disclosure. The screen 730 may be presented to a member of a neighborhood group that has received a lost child alert, and may have joined the search for the missing child. More specifically, the screen 730 comprises a title identifying the application, for example, the "LOCAL ALERT APPLICATION," and a sub-title indicating the purpose of the screen, for example, "LOST CHILD ALERT." The screen 730 further provides information as to the status of the lost child, for example, the time that has elapsed since the alert was issued (e.g., Searching for 14 minutes) and the number of users searching for the child (e.g., 27 Active Users are searching). Additionally, the screen 730 provides a data transmission object (Update Current Status) adapted to send a request to the local alert server 110 for the current information related to the alert.

Further, the screen 730 provides instruction in the case the user happens to find the child ("If you spot Lisa Doe, please click the "Found Child). Finally, the screen 730 includes a first data transmission object (Found Child) adapted to initiate the process of notifying the local alert server 110 that the user has found the missing child, and a second data transmission object (Remove Me) to send a request to the local alert server 110 to remove the user from the search efforts for the child. It shall be understood that the screen 730 is merely an example, and may be configured differently to achieve the same or similar objectives.

FIG. 7C illustrates a diagram of an exemplary user device screen 740 associated with a lost child alert in accordance with another aspect of the disclosure. The screen 740 may be presented to a member of a neighborhood group that has activated the Found Child button on screen 730. More specifically, the screen 740 comprises a title identifying the application, for example, the "LOCAL ALERT APPLICATION," a first sub-title indicating the purpose of the screen, for example, "LOST CHILD ALERT," and a second sub-title "Found Child." The screen 740 further provides a data input object adapted to receive an electronic picture of the child. Additionally, the screen 740 includes a statement that the current location of the user as well as the child's picture will be sent to the local alert server 110. Finally, the screen 740 includes a data transmission object (Send) adapted to send the child's picture and location information to the local alert server 110. It shall be understood that the screen 740 is merely an example, and may be configured differently to achieve the same or similar objectives.

FIG. 7D illustrates a diagram of an exemplary screen 750 associated with a lost child alert in accordance with another aspect of the disclosure. The screen 750 may be presented to a member of a neighborhood group that has activated the Send button on screen 740. More specifically, the screen 750 comprises a title identifying the application, for example, the "LOCAL ALERT APPLICATION," a first sub-title indicating the purpose of the screen, for example, "LOST CHILD ALERT," and a second sub-title "Report Sent." The screen 750 further provides a statement indicating that the reporting of the found child was sent to the user issuing the missing child alert. Additionally, the screen 750 includes a statement indicating that the alert remains active until the alert originator terminates it. It shall be understood that the screen 750 is merely an example, and may be configured differently to achieve the same or similar objectives.

FIG. 8A illustrates a flow diagram of an exemplary method 800 of creating a found child alert for a neighborhood group in accordance with another aspect of the disclosure. In the previous ("lost child") scenario, the alert concerned a missing child pertaining to the user originating the alert, such as a parent, legal guardian or caretaker. In the "found child" scenario, a user finds a lost child not associated with the user. In this case, the user wants to send a found child alert in order to reunite the child with his/her parent, legal guardian or caretaker.

In this regard, the user accesses a "found child alert" screen provided by the user device 112 or 114 (block 802). Using the screen, the user enters information regarding the found child (block 802). For example, such information may include the child's name, gender, age and location at which the child was found. Additionally, using the screen, the user may input an electronic picture of the child (block 806). Finally, using the screen, the user transmits the information and child picture to the local alert server 110 (block 808). The local alert server 110, in turn, creates a found child data object (block 810), and transmits the found child alert to members of the user's neighborhood group, and/or that reside within a defined radius of the location at which the child was found, and/or a participating local law enforcement agency (block 812).

FIG. 8B illustrates a diagram of an exemplary user device screen 820 associated with creating a found child alert in accordance with another aspect of the disclosure. In particular, the screen 820 facilitates a user sending a found child alert with information relevant to the child as well as an electronic picture of the child. More specifically, the screen 820 comprises a title identifying the application, for example, the "LOCAL ALERT APPLICATION," and a sub-title indicating a purpose of the screen, for example, "FOUND CHILD ALERT." Additionally, the screen 820 includes data input objects adapted to receive the found child's name, gender, age, and location at which the child was found. The screen 820 also includes a data input object to receive an electronic picture (or video) of the child. Finally, the screen 820 includes a data transmission object (e.g., "SEND ALERT" soft button) adapted to transmit the child information and picture to the local alert server 110. It shall be understood that the screen 820 is merely an example, and may be configured differently to achieve the same or similar objectives.

Figure 8C:
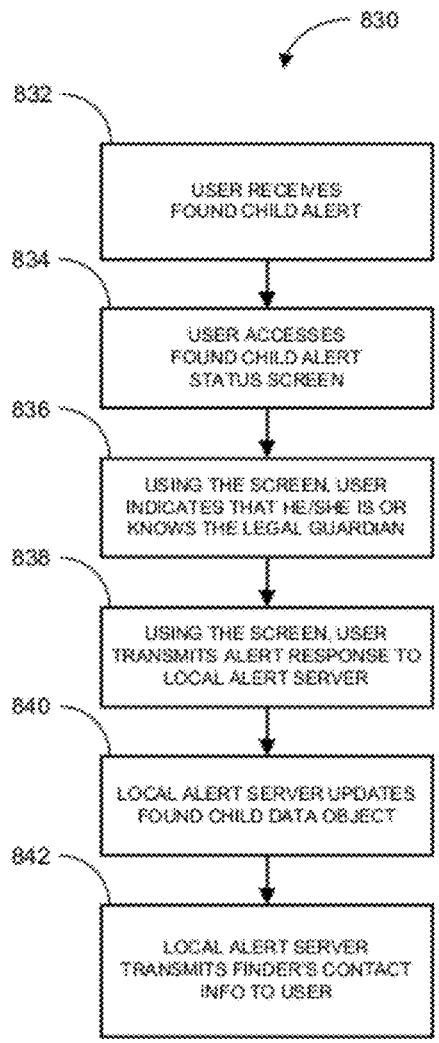
FIG. 8C illustrates a flow diagram of an exemplary method of responding to a found child alert for a neighborhood group by a user in accordance with another aspect of the disclosure.

FIG. 8C illustrates a flow diagram of an exemplary method 830 of responding to a found child alert by a user (e.g., parent, legal guardian, caretaker, friend) who knows the child in accordance with another aspect of the disclosure. According to the method 830, the user receives a found child alert on his/her user device 112 or 114 sent by the local alert server 110 (block 832). In response to the alert, the user accesses a found child alert status screen (block 834). Using the screen, the user indicates whether he/she is the legal guardian or knows the identity of the legal guardian (block 836). Additionally, using the screen, the user transmits the indicated information regarding the legal guardian to the local alert server (block 838). The local alert server 110 updates the found child data object with the information (block 840). The local alert server 110 then transmits the finder's contact information to the user (block 842).

Figure 8D:
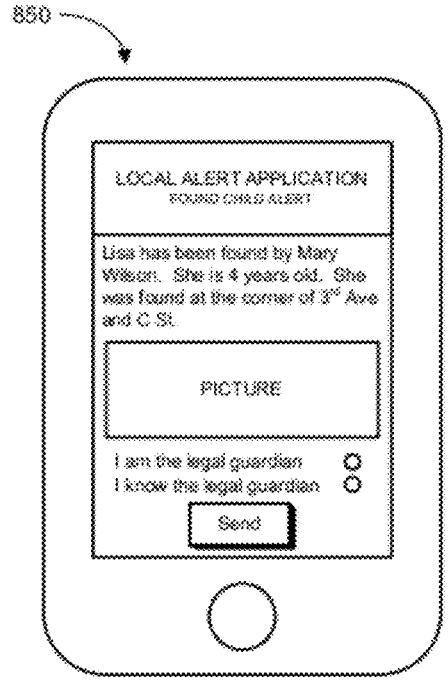
FIGS. 8D-8E illustrate a diagram of an exemplary screen associated with responding to a found child alert for a neighborhood group by a user in accordance with other aspects of the disclosure.

FIG. 8D illustrates a diagram of an exemplary user device screen 850 associated with a found child alert in accordance with another aspect of the disclosure. In particular, the screen 850 facilitates a user responding to a found child alert by indicating that he/she is the legal guardian or knows the legal guardian. More specifically, the screen 850 comprises a title identifying the application, for example, the "LOCAL ALERT APPLICATION," and a sub-title indicating a purpose of the screen, for example, "FOUND CHILD ALERT." Additionally, the screen 850 includes a statement indicating the identity of the person that found the child, the child's age, and the location at which the child was found. Also, the screen 850 includes an electronic picture of the child. The screen 850 provides a data input object adapted to receive information as to whether the user is the legal guardian of the child or knows the legal guardian. Finally, the screen 850 includes a data transmission object (e.g., "Send" soft button) adapted to transmit the user's legal guardian status information to the local alert server 110. It shall be understood that the screen 850 is merely an example, and may be configured differently to achieve the same or similar objectives.

Figure 8E:
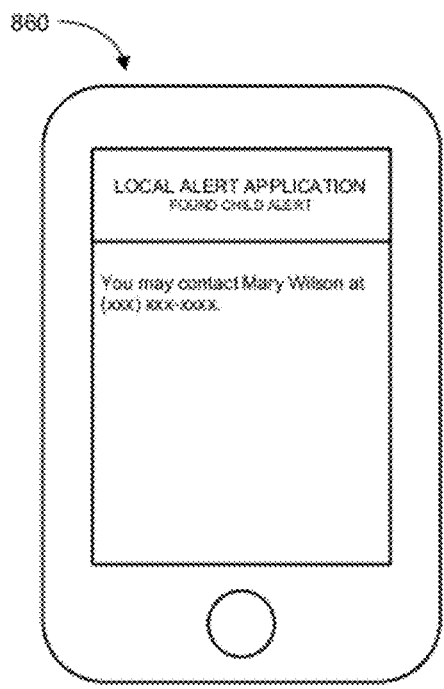

FIG. 8E illustrates a diagram of an exemplary user device screen 860 associated with a found child alert in accordance with another aspect of the disclosure. In particular, the screen 860 provides contact information of the child's finder to a user associated with the child. More specifically, the screen 860 comprises a title identifying the application, for example, the "LOCAL ALERT APPLICATION," and a sub-title indicating a purpose of the screen, for example, "FOUND CHILD ALERT." Additionally, the screen 860 provides the identity and contact information of the child's finder ("You may contact Mary Wilson at (xxx) xxx-xxx."). It shall be understood that the screen 860 is merely an example, and may be configured differently to achieve the same or similar objectives.

Figure 9:
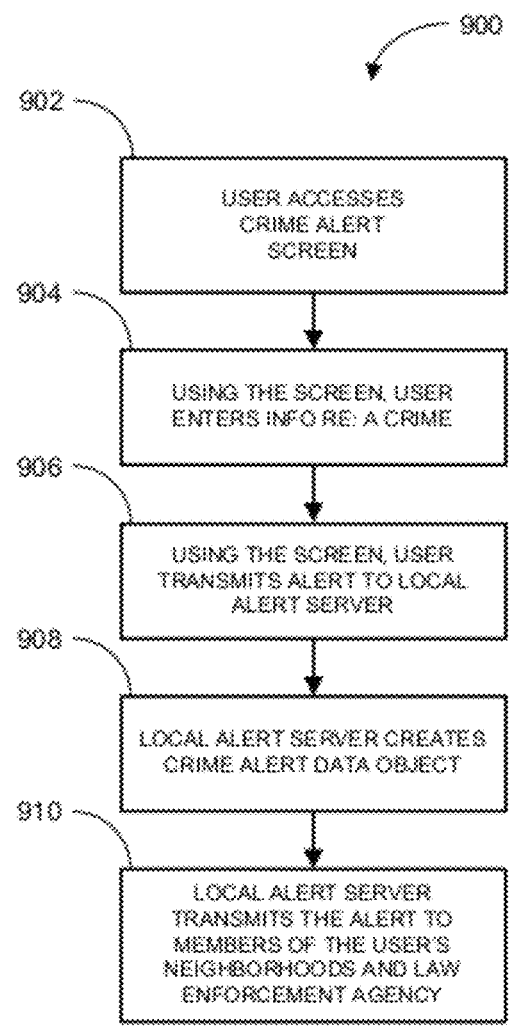
FIG. 9 illustrates a flow diagram of an exemplary method of creating a crime alert for a neighborhood group in accordance with another aspect of the disclosure.

FIG. 9 illustrates a flow diagram of an exemplary method 900 of creating a crime alert for a neighborhood group in accordance with another aspect of the disclosure. In the previous examples, the alerts involved a lost child. However, it shall be understood that the local alert application described herein need not be limited to missing people applications. For example, other relevant information, such as a lost pet, lost person (regardless of age), found person (regardless of age), etc. may be provided to members of one's neighborhood group. In the example regarding method 900, the alert concerns a crime observed or reported near the vicinity of the neighborhood.

More specifically, according to the method 900, a user accesses a crime alert screen on his/her user device 112 or 114 (block 902). Using the screen, the user enters information related to the observed or reported crime (block 904). For example, the information may include the nature of the crime, the location, the time it happened, victim information, and other relevant information. Further, using the screen, the user transmits the crime alert including the entered information to the local alert server 110 (block 906). The local alert server 110, in turn, creates a crime alert data object to include the received information regarding the crime (block 908). Finally, the local alert server 110 transmits an alert concerning the crime to members of the user's neighborhood group and any associated law enforcement agency (block 910). This information may be useful to law enforcement agency in solving the crime, as well as to members of the neighborhood group in taking crime prevention and reporting measures.

Figure 10:
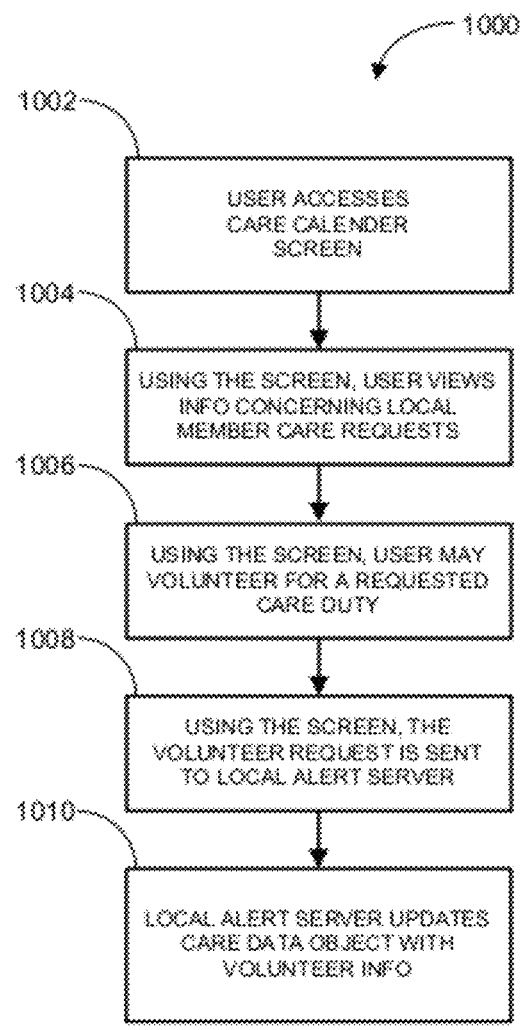
FIG. 10 illustrates a flow diagram of an exemplary method of creating a care request for a neighborhood group in accordance with another aspect of the disclosure.

FIG. 10 illustrates a flow diagram of an exemplary method 1000 of creating a care volunteer request for a neighborhood group in accordance with another aspect of the disclosure. The neighborhood group described herein may also be useful in providing assistance to elderly and disabled residents of the neighborhood. In this regard, members of the neighborhood group may send care calendar alerts requesting volunteers for assisting people, including the particular assistance needed, and the corresponding the dates and times.

More specifically, according to the method 1000, a user accesses a "care calendar" screen on his/her user device 112 or 114 (block 1002). Using the screen, the user views information, for example in a calendar format, related to requests for specified care for identified people (block 1004). As discussed above, such information may include the identity of the people needing assistance, the nature of the assistance, and the relevant locations, dates, times and duration of the requested care. Using the screen, the user selects one or more of the care requests to volunteer for (block 1006). Also, using the screen, the user transmits the volunteer request to the local alert server 110 (block 1008). The local alert server 110, in turn, updates a corresponding care request data object to include the received information regarding the volunteer (block 1010). In this way, people needing care may get assistance from people in their neighborhood.

Figure 11:
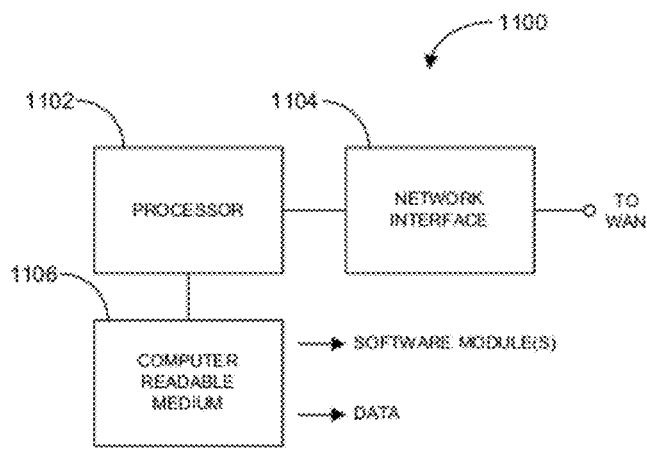
FIG. 11 illustrates a block diagram of an exemplary local alert server in accordance with another aspect of the disclosure.

FIG. 11 illustrates a block diagram of an exemplary local alert server 1100 in accordance with another aspect of the disclosure. The server 1100 may be an exemplary implementation of the local alert server 110 previously discussed. In particular, the local alert server 110 comprises a processor 1102, a network interface 1104, and a computer-readable medium 1106. The processor 1102 performs the defined operations for the server 1100 as previously discussed with respect to neighborhood groups and alerts. The network interface 1104 is adapted to transmit and receive information to and from a wide area network (WAN), such as the Internet. As previously discussed, such information is transmitted to and received from user devices, law enforcement systems, and other devices as described herein. And, the computer-readable medium 1106 is adapted to store one or more software modules configured to control the processor 1102 in performing its defined operations. The computer-readable medium 1106 (e.g., a non-transitory medium) may also store data, such as user profile data objects, neighborhood group data objects, alert data objects, and other data as described herein, for use by the processor 1102 in performing its defined operations.

Figure 12:
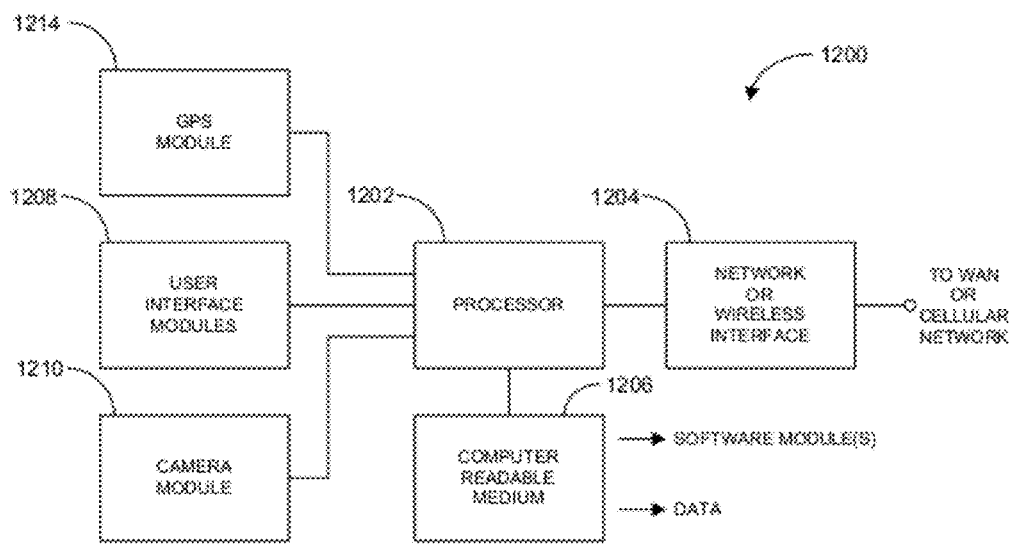
FIG. 12 illustrates a block diagram of an exemplary user device in accordance with another aspect of the disclosure.

FIG. 12 illustrates a block diagram of an exemplary user device 1200 in accordance with another aspect of the disclosure. The user device 1200 may be an exemplary implementation of user device 112 and/or 114, previously discussed. In particular, the user device 1200 comprises a processor 1202, a network or wireless interface 1204, a computer-readable medium 1206, user interface modules 1208, a GPS module 1214, and a camera module 1210. The processor 1202 performs the defined operations for the user device 1200 as previously discussed with respect to neighborhood groups and alerts. The network or wireless interface 1204 is adapted to transmit and receive information to and from a wide area network (WAN), such as the Internet, and/or, a cellular network. As previously discussed, such information is transmitted to and received from a local alert server as described herein. The computer-readable medium 1206 (e.g., a non-transitory medium) is adapted to store one or more software modules configured to control the processor 1202 in performing its defined operations. The computer-readable medium 1206 may also store data as described herein for use by the processor 1202 in performing its defined operations.

The user interface modules 1208, which may comprise a keyboard, microphone, display, speaker, etc., allows a user to provide information to and receive information from the processor 1202 in accordance with the processes described herein. The GPS module 1214 provides information to the processor 1202 as to the current geographical location of the user device 1200 for the particular applications described herein. The camera module 1210 is adapted to provide still pictures or video to the processor 1202 for the purposes described herein.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A server, comprising:
   a network interface configured to interface with a wide area network (WAN);
   a processor configured to:
      create a neighborhood group data object pertaining to a neighborhood group associated with a defined geographical neighborhood in response to a request received, via the network interface, from an administrative user residing within the defined geographical neighborhood;
      receive a plurality of requests, via the network interface, to join the neighborhood group from distinct users residing within the defined geographical neighborhood for the purpose of receiving notifications concerning the defined geographical neighborhood; and
      create a plurality of user profile data objects pertaining to distinct users in response to the received joining requests, respectively;
   a computer-readable medium configured to store the neighborhood group data object including the plurality of user profile data objects.

2. The server of claim 1, wherein the processor is further configured to:
   receive a first notification from at least one of the distinct users by way of the network interface; and
   transmit a plurality of second notifications based on the first notification to a plurality of user devices via the network interface using address information residing in the user profile data objects, respectively.

3. The server of claim 2, wherein the first notification relates to an alert concerning a lost child.

4. The server of claim 3, wherein the processor is further configured to:
   create a lost child data object in response to receiving the first notification; and
   store the lost child data object in the computer-readable medium.

5. The server of claim 4, wherein the lost child data object includes the following:
   information related to an identity or physical characteristic of the lost child;
   information related to a last known location of the lost child; and
   an electronic picture or video of the lost child.

6. The server of claim 5, wherein the processor is further configured to:
   receive a third notification from at least one of the users via the network interface, wherein the third notification indicates that the user has joined a search effort for the lost child; and
   update the lost child data object based on the third notification.

7. The server of claim 6, wherein the processor is configured to transmit a fourth notification based on the third notification to the user from which the first notification was received.

8. The server of claim 4, wherein the processor is further configured to:
   receive a third notification from at least one of the users via the network interface, wherein the third notification indicates the finding of the child; and
   update the lost child data object based on the third notification.

9. The server of claim 8, wherein the processor is configured to transmit a fourth notification based on the third notification to the user from which the first notification was received.

10. The server of claim 9, wherein the fourth notification includes a contact information of the user associated with the finding of the child.

11. The server of claim 2, wherein the first notification relates to an alert concerning a found child.

12. The server of claim 11, wherein the processor is further configured to:
   create a found child data object in response to receiving the first notification; and
   store the found child data object in the computer-readable medium.

13. The server of claim 12, wherein the found child data object includes the following:
   information related to an identity or physical characteristic of the found child;
   information related to a location where the child was found; and
   an electronic picture or video of the found child.

14. The server of claim 13, wherein the processor is further configured to:
   receive a third notification from at least one of the users via the network interface, wherein the third notification indicates that the user is or knows someone associated with the found child; and
   update the found child data object based on the third notification.

15. The server of claim 14, wherein the processor is configured to transmit a fourth notification based on the third notification to the user from which the first notification was received.

16. The server of claim 15, wherein the fourth notification includes a contact information of the user who is or knows someone associated with the found child.

17. The server of claim 2, wherein the first notification relates to a crime allegedly or in-fact committed within or proximate the geographical neighborhood.

18. The server of claim 2, wherein the first notification relates to a request for volunteer care for a person living within or proximate the geographical neighborhood.

19. The server of claim 2, wherein the first notification relates to a lost pet.

20. The server of claim 1, wherein the request to create the neighborhood group includes the following:

information related to an identity of the neighborhood group;

information related to a geographical boundary of the neighborhood; and information related to an identity of the administrative user of the neighborhood group.

21. The server of claim 20, wherein the information related to the geographical boundary of the neighborhood comprises a plurality of coordinates identifying points along the geographical boundary.

22. The server of claim 1, wherein the processor is further configured to transmit an invitation to join the neighborhood group to at least one of the distinct users via the network interface in response a request received from the administrative user.

23. The server of claim 2, wherein the processor is configured to restrict the transmission of the second notifications to the distinct users and one or more designated public agencies.

24. The server of claim 1, wherein one or more of the user profile data object comprises information related to one or more children having the one or more distinct users as legal guardians, respectively.

25. The server of claim 24, wherein the information related to the one or more children comprises:

name, gender, and age or date-of-birth; and a picture or video of the one or more children.

26. The server of claim 2, wherein the processor is configured to receive a third notification indicating a cancellation of the first notification from the user that sent the first notification.

27. The server of claim 2, wherein the processor is further configured to transmit information related to current duration of a search for the lost child and the number of the distinct users that have indicated that they are searching for the lost child to the distinct users via the network interface.

28. The server of claim 2, wherein the processor is further configured to receive a third notification indicating that one of the distinct users joined an effort to search for the lost child, and subsequently receive a fourth notification indicating that the one of the distinct users has abandoned the effort to search for the lost child.

* * * * *